(12) United States Patent
Goldfine et al.

(10) Patent No.: US 6,781,387 B2
(45) Date of Patent: Aug. 24, 2004

(54) INSPECTION METHOD USING PENETRANT AND DIELECTROMETER

(75) Inventors: Neil J. Goldfine, Newton, MA (US); Darrell E. Schlicker, Watertown, MA (US); Markus Zahn, Lexington, MA (US); Wayne D. Ryan, Pembroke, MA (US); Ian C. Shay, Cambridge, MA (US); Andrew Washabaugh, Menlo Park, CA (US)

(73) Assignee: Jentek Sensors, Inc., Waltham, MA (US)

( * ) Notice: Subject to any disclaimer, the term of this patent is extended or adjusted under 35 U.S.C. 154(b) by 0 days.

(21) Appl. No.: 10/225,406

(22) Filed: Aug. 20, 2002

(65) Prior Publication Data

US 2003/0080744 A1 May 1, 2003

Related U.S. Application Data

(60) Division of application No. 09/488,241, filed on Jan. 20, 2000, now Pat. No. 6,486,673, which is a continuation-in-part of application No. 09/003,390, filed on Jan. 6, 1998, now Pat. No. 6,144,206.

(60) Provisional application No. 60/034,541, filed on Jan. 6, 1997, provisional application No. 60/043,695, filed on Apr. 15, 1997, and provisional application No. 60/064,808, filed on Nov. 7, 1997.

(51) Int. Cl.[7] ............................................. G01R 27/26
(52) U.S. Cl. ....................... 324/658; 324/663; 324/71.1
(58) Field of Search ................................ 324/658, 663, 324/686, 71.1, 326; 343/753, 754

(56) References Cited

U.S. PATENT DOCUMENTS

| | | | |
|---|---|---|---|
| 3,249,854 A | 5/1966 | Nevius | 323/108 |
| 3,721,859 A | 3/1973 | Blanyer | 317/5 |
| 3,939,404 A | 2/1976 | Tait | 324/40 |
| 4,058,766 A | 11/1977 | Vogel et al. | 324/61 |
| 4,355,300 A | 10/1982 | Weber | 340/146.3 |

(List continued on next page.)

FOREIGN PATENT DOCUMENTS

| | | |
|---|---|---|
| EP | 0 242 947 | 10/1987 |
| EP | 0 723 166 A1 | 7/1996 |
| GB | 2 031 155 A | 4/1980 |
| SU | 502205 | 2/1976 |
| SU | 578609 | 10/1977 |
| SU | 894547 | 12/1981 |
| SU | 1095101 A | 5/1984 |
| WO | WO 92/03090 | 3/1992 |

OTHER PUBLICATIONS

Goldfine, Neil et al., "Dielectrometers and magnetometers, suitable for in–situ inspection of ceramic and metallic coated components," SPIE Conference, Jun. 1995, 11 pages.

Goldfine, Neil et al., "A New Eddy–Current Based Technology for Repeatable Residual Stress and Age Degradation Monitoring," ASNT International Chemical and Petroleum Industry Inspection Technology IV, Houston, TX Jun. 19–22, 1995, 5 pages.

(List continued on next page.)

Primary Examiner—Jay Patidar
Assistant Examiner—Vincent Q. Nguyen
(74) Attorney, Agent, or Firm—Hamilton, Brook, Smith & Reynolds, P.C.

(57) ABSTRACT

Described is an inspection method for detecting defects in dielectic test materials using a penetrant material and a dielectric sensor. The penetrant material provides differing dielectric properties from test material and improves the dielectric contrast between defects substantially filled by the penetrant and the test material. The penetrant can be a liquid, such as water, or a powder, as long as it provides a substantially different complex permittivity than the test material.

4 Claims, 28 Drawing Sheets

U.S. PATENT DOCUMENTS

| | | | |
|---|---|---|---|
| 4,399,100 A | 8/1983 | Zsolnay et al. | 422/62 |
| 4,423,371 A | 12/1983 | Senturia et al. | 324/61 |
| 4,496,697 A | 1/1985 | Zsolnay et al. | 526/60 |
| 4,757,259 A | 7/1988 | Charpentier | 324/227 |
| 4,799,010 A | 1/1989 | Muller | 324/240 |
| 4,810,966 A | 3/1989 | Schmall | 324/207 |
| 4,814,690 A | 3/1989 | Melcher et al. | 324/61 |
| 4,853,617 A | 8/1989 | Douglas et al. | 324/67 |
| 4,883,264 A | 11/1989 | Yoshikawa et al. | 271/110 |
| 4,912,414 A | 3/1990 | Lesky et al. | 324/329 |
| 4,922,201 A | 5/1990 | Vernon et al. | 324/236 |
| 5,015,951 A | 5/1991 | Melcher | 324/232 |
| 5,041,785 A | 8/1991 | Bogaerts et al. | 324/207.24 |
| 5,059,902 A | 10/1991 | Linder | 324/207.17 |
| 5,086,274 A | 2/1992 | Gobin et al. | 324/239 |
| 5,182,513 A | 1/1993 | Young et al. | 324/232 |
| 5,204,621 A | 4/1993 | Hermann et al. | 324/207.18 |
| 5,237,271 A | 8/1993 | Hedengren | 324/232 |
| 5,262,722 A | 11/1993 | Hedengren et al. | 324/242 |
| 5,278,498 A | 1/1994 | Vernon et al. | 324/234 |
| 5,293,119 A | 3/1994 | Podney | 324/242 |
| 5,315,234 A | 5/1994 | Sutton, Jr. et al. | 324/242 |
| 5,345,514 A | 9/1994 | Mahdavieh et al. | 382/8 |
| 5,363,051 A | 11/1994 | Jenstrom et al. | 324/661 |
| 5,371,461 A | 12/1994 | Hedengren | 324/225 |
| 5,371,462 A | 12/1994 | Hedengren et al. | 324/225 |
| 5,373,245 A | 12/1994 | Vranish | 324/662 |
| 5,389,876 A | 2/1995 | Hedengren et al. | 324/242 |
| 5,418,457 A | 5/1995 | Hedengren et al. | 324/225 |
| 5,434,504 A | 7/1995 | Hollis et al. | 324/207.17 |
| 5,442,347 A | 8/1995 | Vranish | 340/870.37 |
| 5,453,689 A | 9/1995 | Goldfine et al. | 324/239 |
| 5,463,201 A | 10/1995 | Hedengren et al. | 219/121.83 |
| 5,485,084 A | 1/1996 | Duncan et al. | 324/225 |
| 5,512,335 A * | 4/1996 | Miller et al. | 427/600 |
| 5,541,510 A | 7/1996 | Danielson | 324/233 |
| 5,629,621 A | 5/1997 | Goldfine | 324/239 |

OTHER PUBLICATIONS

Krampfner, Yehuda D. and Johnson, Duane D., "Flexible Substrate Eddy Current Coil Arrays," Review of Progress in Quantitative Nondestructive Evaluation, vol. 7A, 1988. pp 471–478, no month available.

Rose, James H. and Nair, Satish M., "Exact recovery of the DC electrical conductivity of a layered solid," Inverse Problems, Letter to the Editor, 1991, pp. L31–L36, no month available.

Auld, B.A. et al., "Eddy–Current Signal Analysis and Inversion for Semielliptical Surface Cracks," Journal of Nondestructive Evaluation, vol. 7, No. 1/2, 1988, pp. 79–94, no month available.

Goldfine, Neil and Roach, Dennis, "Early Stage and Widespread Fatigue Damage Assessment for Aircraft Structures and Engines, Using a New Conformable Multiple–Frequency Eddy Current Sensor," ATA NDT Forum, Indianapolis, IN Sep. 8–11, 1997, pp. 1–13.

Goldfine, Dr. Neil J., "Early Stage Fatigue Detection with Application to Widespread Fatigue Damage Assessment in Military and Commercial Aircraft," DOD/FAA/NASA Conference on Aging Aircraft, Ogden, UT, Jul. 8–10, 1997, pp. 1–10.

Zaretsky, M., et al., "Modal Approach to Obtaining Continuum Properties From Inter–Digital Electrode Dielectrometry," Massachusetts Institute of Technology, Lees Technical Report, Jul. 1986, pp 1–43.

Dodd, V.C. and Deeds, W.E., "Absolute Eddy–Current Measurement of Electrical Conductivity," From "Review of Progress in Quantitative Nondestructive Evaluation," vol. 1, 1982, pp. 387–394, no month available.

Dodd, C.V. and Simpson, W.A., "Measurement of Small Magnetic Permeability Changes by Eddy Current Techniques," presented at the National Fall Conference of the American Society for Nondestructive Testing, Oct. 19–22, 1970, pp. 217–221, no month available.

Goldfine, Neil J., "Magnetometers for Improved Materials Characterization in Aerospace Applications," Materials Evaluation, Mar. 1993, pp. 396–405.

Goldfine, Neil and Clark, David, "Near Surface Material Property Profiling for Determination of SCC Susceptibility," EPRI Balance–of–Plant Heat Exchanger NDE Symposium, Jackson Hole, WY, Jun. 10–12, 1996.

Morrison, Philip and Tsipis, Kosta, "New Hope in the Minefields," Massachusetts Institute of Technology's *Technology Review*, ISSN 0040–1692, vol. 100, No. 7, pp. 38–47, no date given.

"Innovations in Quantitative Nondestructive Evaluation," JENTEK Sensors, Inc. Brochure, No. Date Given.

Goldfine, Neil et al., "Surface–Mounted Eddy–Current Sensors For On–Line Monitoring of Fatigue Tests and For Aircraft Health Monitoring," Second Joint NASA/FAA/DoD Conference on Aging Aircraft, Aug. 1998, pp. 1–16.

Goldfine, Neil, "Uncalibrated, Absolute Property Estimation and Measurement Optimization for Conducting and Magnetic Media Using Imposed ω–k Magnetometry," Doctoral Thesis, Cataloged into the Massachusetts Institute of Technology Libraries on Oct. 6, 1992, pp. 1–139.

Miyakawa, Tasuo and Honjo, Ken, "Development of Instrument Detecting Nonmetal Foreign Bodies in Food Material," IEEE Transactions on Instrumentation and Measurements, Apr. 1994, pp. 359–362.

* cited by examiner

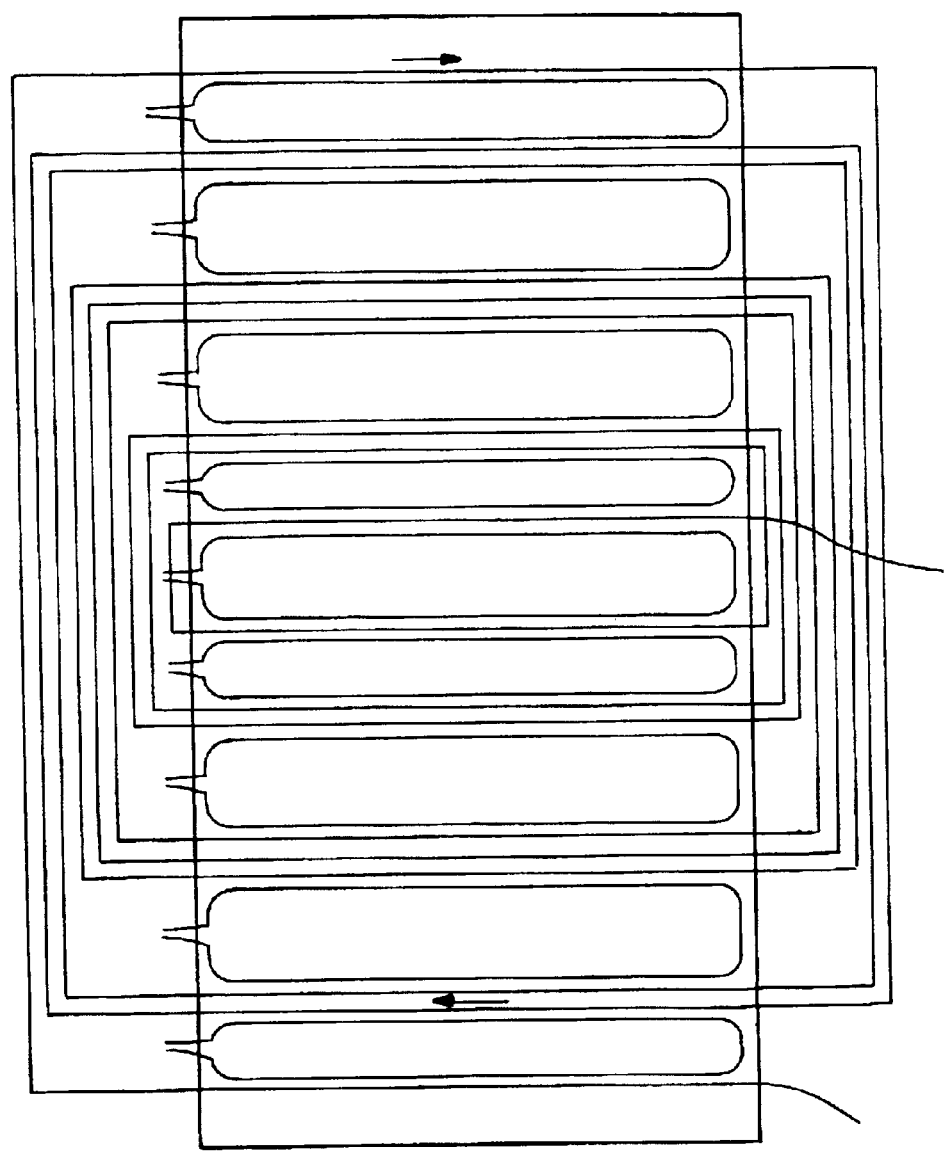

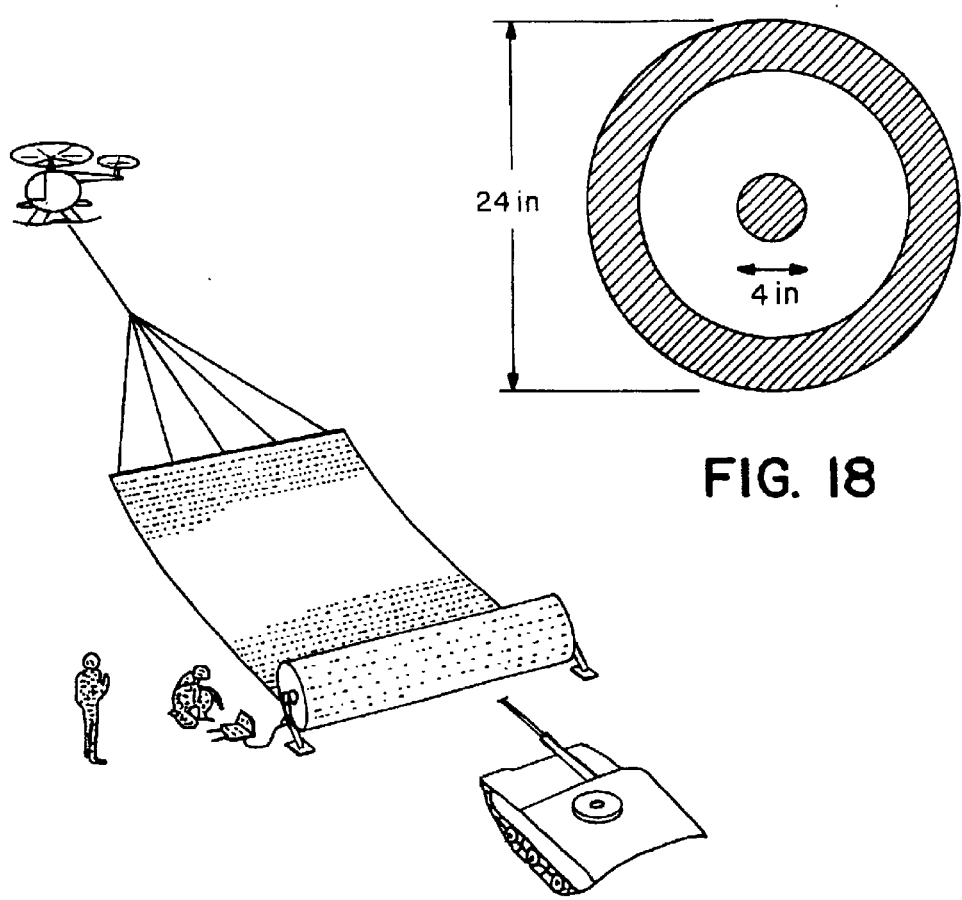
FIG. 18
FIG. 19A
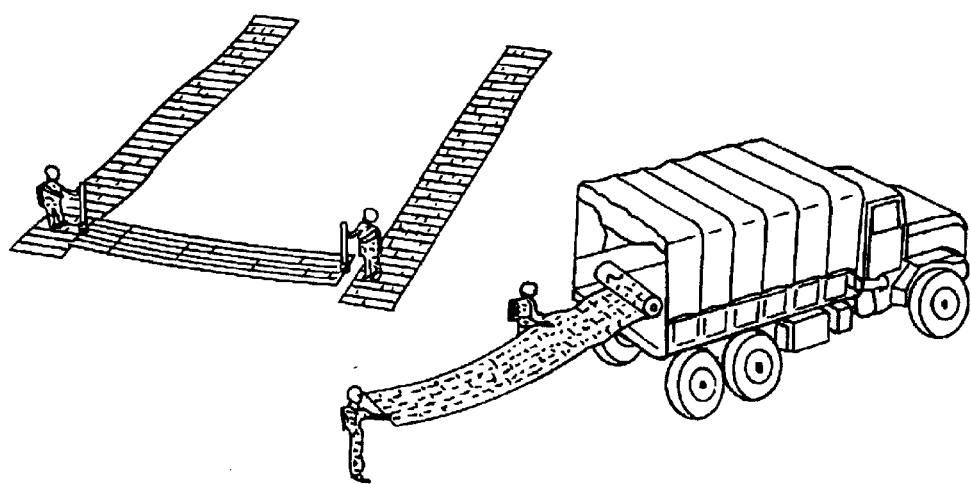
FIG. 19B

INSPECTION METHOD USING PENETRANT AND DIELECTROMETER

RELATED APPLICATION(S)

This application is a Divisional of U.S. application Ser. No. 09/488,241 filed Jan. 20, 2000, now U.S. Pat. No. 6,486,673, which claims the benefit of U.S. Provisional Application No. 60/121,713 filed Feb. 26, 1999, and is a Continuation-in-Part of U.S. application Ser. No. 09/003,390 filed Jan. 6, 1998, which issued as U.S. Pat. No. 6,144,206, and which claims the benefit of U.S. Provisional Application Nos. 60/064,808 filed Nov. 7, 1997, 60/043,695 filed Apr. 15, 1997, and 60/034,541 filed Jan. 6, 1997.

The entire contents of the above applications are incorporated herein by reference.

GOVERNMENT SUPPORT

The invention was supported, in whole or in part, by a grant Contract Number DAAB07-97-C-J002 from the Department of the Army. The Government has certain rights in the invention.

BACKGROUND OF THE INVENTION

According to the United Nations, there are over 100 million land mines currently deployed in more than 60 countries. The mines themselves range from large anti-tank mines to small anti-personnel mines and from all metal construction to primarily plastic or even wood. Triggering mechanisms range from direct pressure, to trip wires to magnetic sensors and fiber optics.

In addition, millions of bomblets were deployed as Cluster Bomb Units (CBUs) during wars and military actions. A significant number of these failed to explode and continue to threaten the populations indigenous to the original combat zones. Being largely constructed of metal, unexploded bomblets are readily detectable with existing hand-held metal detectors. However, current metal detectors have no way of discriminating an intact bomblet, which may be buried at depths up to 12 inches, from a bomblet fragment or other piece of shrapnel or metallic debris that is near the surface.

The US Army currently has a deployed mine detector called the AN/PSS-12. This is an inductive type detector that utilizes the creation of eddy currents in a metallic mine to alter the search coil impedance. This detector has served the Army well, but to be reliably detected, mines must be directly below the search head and must contain some metal. Other methods such as ground penetrating radar, infrared, and X-Ray have been investigated to solve the difficult problem of detecting low-metal and no-metal mines.

SUMMARY OF THE INVENTION

This invention relates to detection apparatus and methods which are capable of discriminating between mines, bomblets and other objects buried below the surface of the ground by detecting object depths, sizes, shapes, orientations and/or electrical properties. An inductive magnetometer is best suited to detecting and characterizing metallic objects; whereas, a capacitive dielectrometer is particularly effective in detecting and characterizing nonmetallic objects.

In the preferred magnetometer, a plurality of parallel, spaced linear conductor sets are disposed in proximity to the ground. An electromagnetic field is imposed in the ground with a dominant spatial wavelength through the conductor sets. A resulting electromagnetic response of the object in the ground to the imposed magnetic field is sensed. The method, in a preferred embodiment, also includes the step of translating electromagnetic response into estimates of one or more properties of the object based on a modeled response to the spatial wavelength.

In a preferred magnetometer embodiment, the dominant spatial wavelength has a length of at least 12 inches. The apparatus also has a rigid conductor element support structure adapted to be scanned across the ground.

In a preferred magnetometer, a primary winding has a series of parallel, spaced linear conductor sets driven by a current. The number of parallel conductors in the parallel conductor sets varies so as to shape the applied magnetic field. The applied field is periodic sinusoidal in a preferred embodiment.

The sensor in a preferred embodiment is an array of secondary windings. At least one of the secondary windings is located between parallel conductor sets of each pair of adjacent parallel conductor sets of the primary winding. The apparatus may have a second secondary array and primary winding which is perpendicular to the first set of parallel conductors of the first primary winding.

In a preferred embodiment of the dielectrometer apparatus, an excitation electrode carried on a sensor face is driven with a varying voltage, and a sensing electrode is carried by the sensor face. A guard electrode of the sensor face surrounds the sensing electrode and is at about the same voltage as the sensing electrode.

A shielding plane is located behind and spaced from the sensor face for blocking unwanted interference in one of the preferred embodiments of the dielectrometer apparatus. A guard plate is also interposed between the shielding plane and the guard electrode. A high-impedance buffer is connected to the sensing electrode to measure the magnitude and phase of the floating potential. The sensor face has an area of at least a square foot for mine detection but could be used in a smaller form for other applications, such as cure monitoring of thin coatings.

In one preferred embodiment of the dielectrometer apparatus, the sensing electrode has a plurality of elements in a column at different distances to the excitation electrode. In another preferred embodiment, the sensing electrode has a plurality of elements in a row wherein each element is equidistant to the excitation electrodes. The elements may be connected such that differences in measurements between adjacent elements can be used to detect small spatially abrupt changes in the dielectric properties, and to account for variations in stand-off distance from the sensor to the soil surface.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6B illustrates a preferred wiring pattern of the deep penetration primary winding for shaping the sinusoidal;

FIG. 17Cb shows the scanning of a metallic bomblet;

FIG. 18 illustrates a circular center electrode surrounded by a coplanar, concentric electrode, a "Bull's Eye" Sensor;

FIG. 19A illustrates a helicopter deployment of a roadway sensor for rapid minefield breaching;

FIG. 19B illustrates a tape dispensed sensor suitable for path clearing;

DETAILED DESCRIPTION OF THE INVENTION

A description of preferred embodiments of the invention follows.

This invention relates to two new sensing capabilities that are complementary and both field deployable and supportable. The first sensing capability is magnetoquasistatic, an inductive sensor, which will be referred to as Meandering Winding Magnetometer (MWM). The second sensing capability is an electroquasistatic, capacitive sensor which will be referred to either as an Interdigitated Electrode Dielectrometer (IDED) for periodic constructs or as a dielectrometer for non-periodic constructs. The sensors individually have certain capabilities to determine the depth, material type, size and orientation of a subsurface object as described below. The synergy of the two sensors allows further capability.

The principal surface considered is that interface between air and ground, wherein the ground is a mixture of one or more of dirt, sand, rock, moisture and other such materials. A subsurface object is generally an object which is located within 2 feet of the surface and particularly within 12 inches.

Meandering Winding Magnetometer (MWM) Sensor

Figure 1:
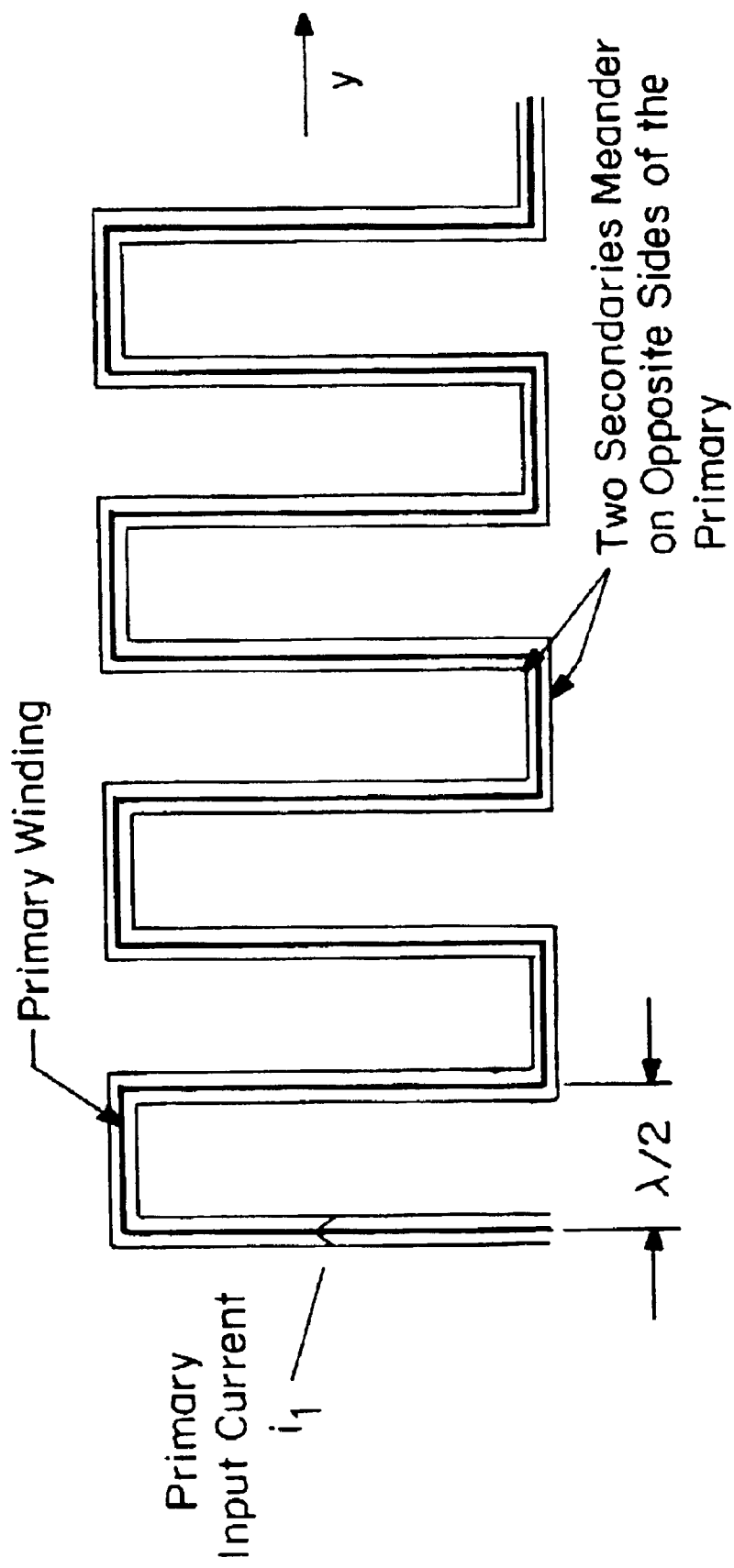
FIG. 1 is a schematic illustration of a Meandering Winding Magnetometer (MWM)

The magnetoquasistatic sensing capability using a Meandering Winding Magnetometer (MWM) will be described first. The MWM comprises a meandering primary winding, with one or more secondary windings such as the meandering secondary on each side of the primary as illustrated in FIG. 1. The MWM is essentially a planar transformer, in which the primary winding is inductively coupled with the secondary winding through the neighboring material.

Figure 2A:
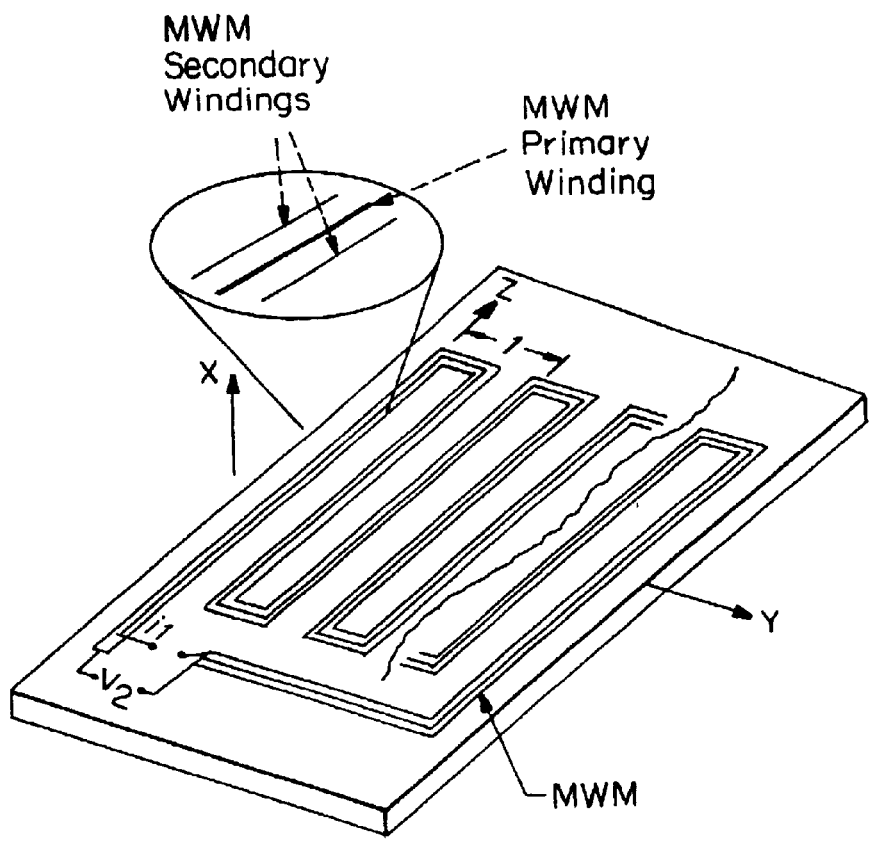
FIG. 2A illustrates the MWM Sensor.

The secondary windings, which meander on opposite sides of the primary, are connected in parallel to reduce capacitive coupling and to maintain symmetry as illustrated in FIG. 2A. The winding spatial wavelength is indicated by $\lambda$. A current, $i_1$, is applied to the primary winding and a voltage, $v_2$, is measured at the terminals of the secondary windings.

Figure 2B:
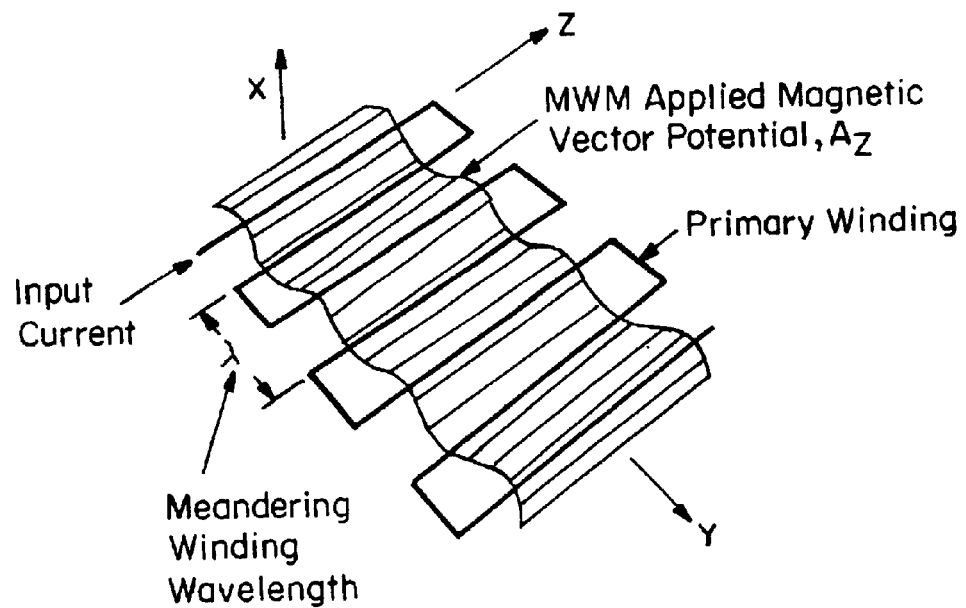
FIG. 2B illustrates a "Standing Wave" of Magnetic Vector Potential, $A_z$, produced by the Dominant Fourier Mode, Corresponding to the $A_1$ Fourier Amplitude.

The shape of the MWM windings produces a spatially periodic magnetic field as shown in FIG. 2B. The spatial periodicity of the field is a key attribute of the MWM and is the principal reason it can be modeled with such accuracy. The MWM continuum models permit precise determination of depth and material properties for detected objects.

The MWM is tailored such that the magnetic vector potential produced by the current in the primary winding can be accurately modeled as a Fourier series summation of sinusoids in Cartesian (x,y,z) coordinates. The tailoring is described in further detail in U.S. Pat. No. 5,453,689 titled "Magnetometer Having Periodic Winding Structure and Material Property Estimator" which issued on Sep. 26, 1995, the entire contents of which are incorporated herein by reference.

In the magneto-quasistatic regime, the MWM primary winding produces a sinusoidal "standing wave" magnetic vector potential. The spatial wavelength of this standing wave is determined by the MWM primary winding geometry and is independent of the input current temporal frequency. The fundamental Fourier mode wavelength is equal to the physical, spatial wavelength of the MWM primary winding, as shown in FIG. 2B. The uniform standing wave field produced by the MWM sensor maintains its shape over a significant footprint area. Thus, for MWMs with multiple periods (i.e., more than four) a subsurface object, such as a bomblet, will produce the same MWM response at all locations within the MWM footprint (i.e., <½ wavelength from the edge of the sensing region).

The MWM sensors can be fabricated in several embodiments. These can have either multiple periods, a single period (i.e., only one period of a sine wave is produced by the field shaping primary), or a fraction of a period (e.g. half). While the embodiments will be described with respect to preferred embodiments for a particular size range, such descriptions are not meant to limit particular sizes to particular embodiments.

Figure 3:
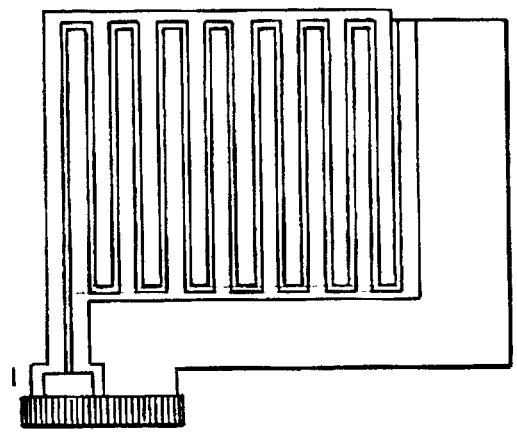
FIG. 3 shows a Meandering Winding Magnetometer sensor of conductive material on a nonconductive substrate.

One embodiment of sensors is fabricated by deposition and selective removal of a conducting material on a thin film nonconducting substrate as seen in FIG. 3. This printed conducting material is considered a wire. This method of sensor construction allows the sensor to be very thin and of very low mass.

An alternative embodiment of sensor is to use a series of wires coiled into a desire pattern. This embodiment is a preferred embodiment for sensors having a surface area over a square foot. In a preferred embodiment the sensor is approximately 32 in.×24 in., with only one primary winding period.

In certain embodiments of the over square foot array, arrays of secondary windings elements provide spatial resolution of indications on the order of an inch. This effectively maps the individual metallic components under the MWM footprint, permitting discrimination of an intact bomblet from bomblet fragments, shrapnel, or other metallic debris. This array construct also permits the use of multiple turn (coil) sensing elements (also called secondary windings) in the form of elongated coils. Thus, a large wavelength drive is used to provide deep penetration, while multiple sensing elements are used to provide high spatial resolution.

Figure 4:
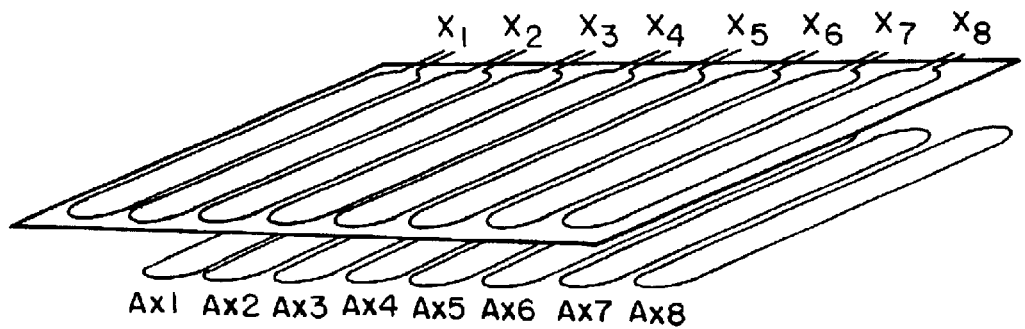
FIG. 4 an array of Secondary Windings, $x_1$ through $x_8$ with Corresponding Areas of Sensitivity $A_{x1}$ through $A_{x8}$.

FIG. 4 shows an array of secondary windings confined to a single plane. The individual windings in this array are designated $x_1$ through $x_8$. (The associated primary winding is not shown in this figure.) Ideally, each individual secondary winding would be sensitive only to conducting material in an elongated area, shown as $A_{x1}$ through $A_{x8}$, in FIG. 4. In practice, however, the secondary winding elements will be somewhat affected by objects located outside of these regions, as well. Thus, a more complex computation will be required to create accurate images of detected objects.

Windings can be stacked for increased output. For example, the array shown in FIG. 4 can be repeated in successive layers. The output of each illustrated coil, such as $X_1$ crosses over to the input of the next lower coil such that a stack of turns $X_1$ result in a spiral coil. In order that the array follows the model closely, the thickness between coil planes should be small relative to the wavelength of the array.

Figure 5:
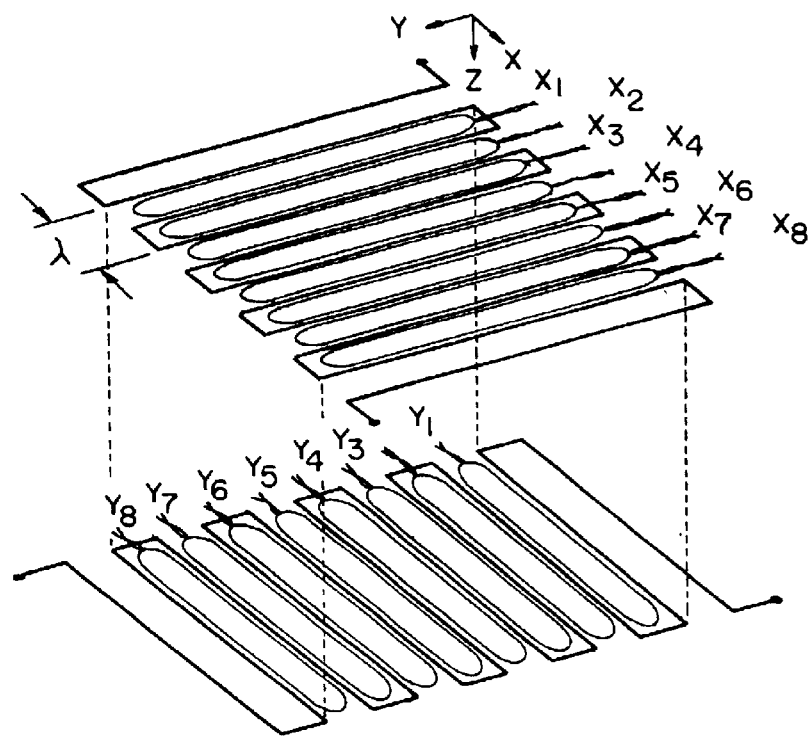
FIG. 5 illustrate orthogonal arrays of secondary windings, with the corresponding meandering primary windings.

FIG. 5 illustrates an orthogonal combination of two secondary winding arrays. These arrays, along with the associated meandering primary windings also shown in the figure, are stacked in one embodiment of the bomblet discrimination sensor to provide the mechanism for locating and sizing detections.

The typical required depth of penetration for the detection of subsurface weapons such as land mines and bomblets is six to twelve inches from the surface. A rule of thumb for the depth of penetration of the MWM fields is that the maximum field penetration is approximately one half wavelength from the sensor winding plane. The 24 inch by 24 inch MWM, with the orthogonal sensing arrays described above and as shown in FIG. 5, has a wavelength of 6 inches and has a depth of penetration of only 3 inches.

Figure 6A:
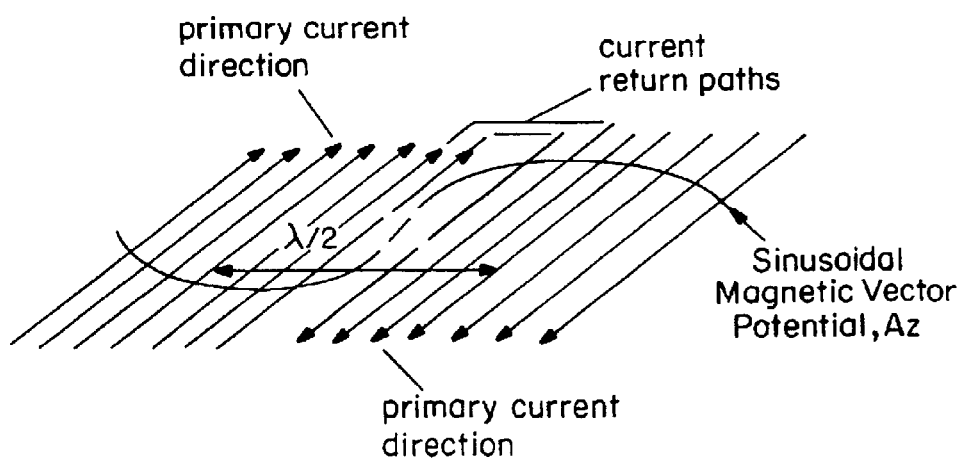
FIG. 6A illustrates a deep penetration primary winding schematic.

For those situations where a deeper penetration of detection is required, a deep penetration winding as shown schematically in FIG. 6A may be used. The deep penetration winding is composed of multiple parallel conductors, half of which carry current in one direction while the other half carry current in the opposite direction. By controlling the current carried by each conductor, this winding design can produce a single period of a sinusoidal magnetic field over the MWM sensing region with a spatial wavelength of 32 inches in the preferred embodiment for a particular bomblet's type. This design can also provide shorter wavelength excitations, i.e., 12 inches, by electronically changing the current directions without changing the physical winding dimensions. This permits the use of multiple spatial wavelength excitations and performance of spectral analysis in space (instead of time) to improve clutter suppression and detection probability. This multiple wavelength interrogation approach is described in greater detail in U.S. Pat. No. 5,015,951 titled "Apparatus and Methods for Measuring Permeability and Conductivity in Material using Multiple Wavenumber Magnetic Interrogations" which issued on May 14, 1991, the entire contents of which are incorporated herein by reference.

The deep penetration winding permits detection of bomblets to a depth of up to 16 inches from the surface, one half its maximum spatial wavelength. The secondary array, as discussed above with respect to the six inch wavelength MWM described in FIG. 4, can be used with either the six inch wavelength MWM primary or with the deep penetration primary winding design. The secondary array permits better spatial resolution than the use of larger sensing elements.

By changing the connections of the parallel conductors, either through hard wired connections or switching, the wave length of the sensor array can be varied from a maximum illustrated in FIG. 6A, where a first half of the conductors conduct current in one direction and a second half conduct in the opposite direction, to a minimum as illustrated in FIG. 2B.

The use of multiple MWM spatial wavelengths provides depth information on detected objects. For example, when the six inch MWM primary is excited, objects deeper than three inches will not be detected. Thus, a bomblet buried at ten inches will only be detected when the deep penetration primary is excited. This provides a clear capability to discriminate between small metallic objects near the surface and bomblets buried far below the surface.

A preferred wiring pattern of the deep penetration primary winding for shaping the sinusoidal wave is shown in FIG. 6B. The primary winding has a series of parallel, spaced sets of linear conductors for receiving current. Each conductor set has at least one wire. The number of parallel wires in each set increases from 1 to 2 to 3 and then back down to 1 before the center line. The number of parallel wires in a set then progresses back to 3 and back down to 1 in the second half wavelength.

Those wires on the left side of the centerline of the sensor have the current flowing up the page as seen in FIG. 6B. Those wires on the right side of the page have the current flowing down the page. The varying numbers of wires in each set and the flow of the current results in a deep penetrating electromagnetic waveform that has a single wavelength equal to the size of the sensor.

An array of secondary windings is illustrated in FIG. 6B. At least one secondary winding is located between each adjacent pair of parallel conductors of the primary winding. In a preferred embodiment, the wires of the primary winding and the secondary windings are insulated metal conductors.

The sets of parallel wires in one embodiment are equally spaced. In another embodiment the spacing of the wires is also varied to shape the applied magnetic field.

Figure 7A:
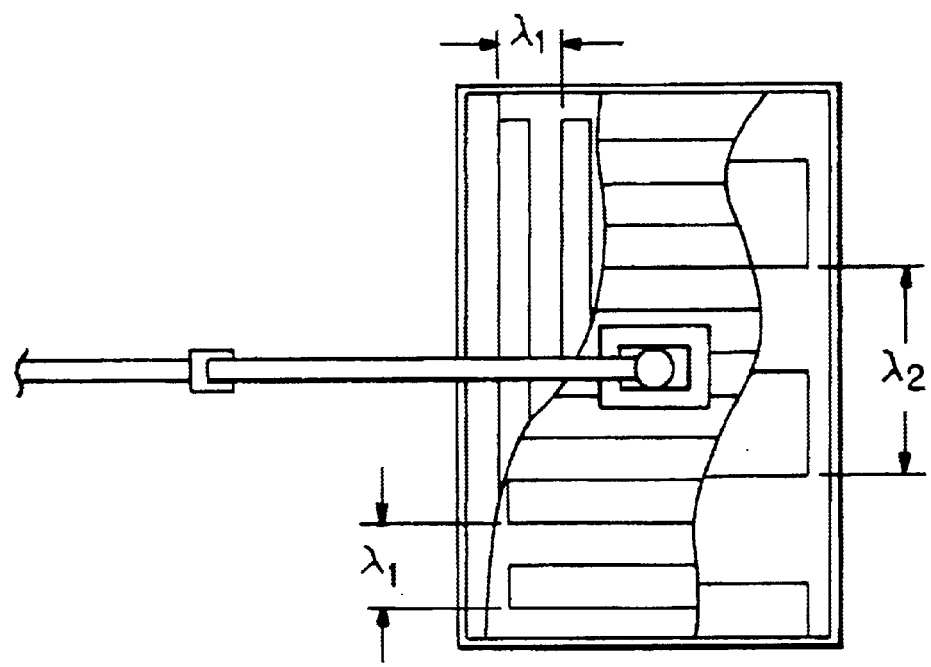
FIG. 7A illustrates a two wave length, two orientation MWM detector.
Figure 7B:
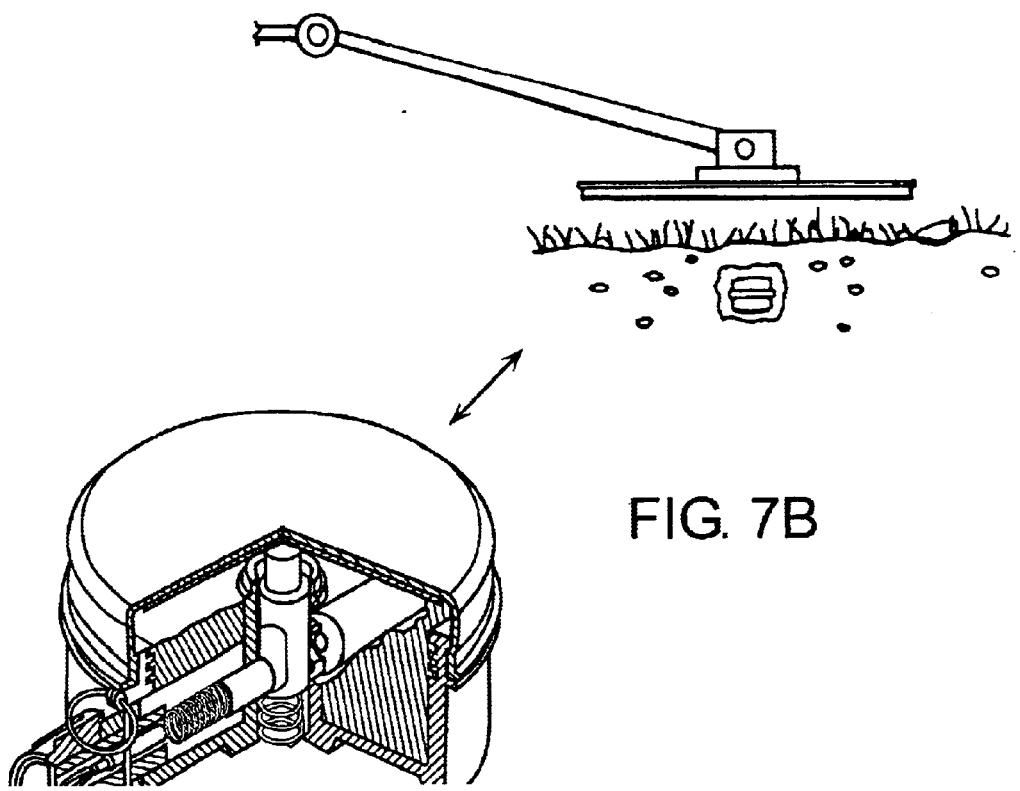
FIG. 7B illustrates a cross section of the sensor over a mine.

A multiple wavelength MWM sensor configuration is shown in FIG. 7A. The MWM sensor stack shown includes two different winding spacings ($\lambda_1$, $\lambda_2$) and two different orientations. Since the spacing of the MWM windings determines the depth of penetration, this permits a real-time determination of depth and an estimate of aspect ratio as discussed below. FIG. 7B illustrates the sensor of FIG. 7A over a land mine.

Figure 8A:
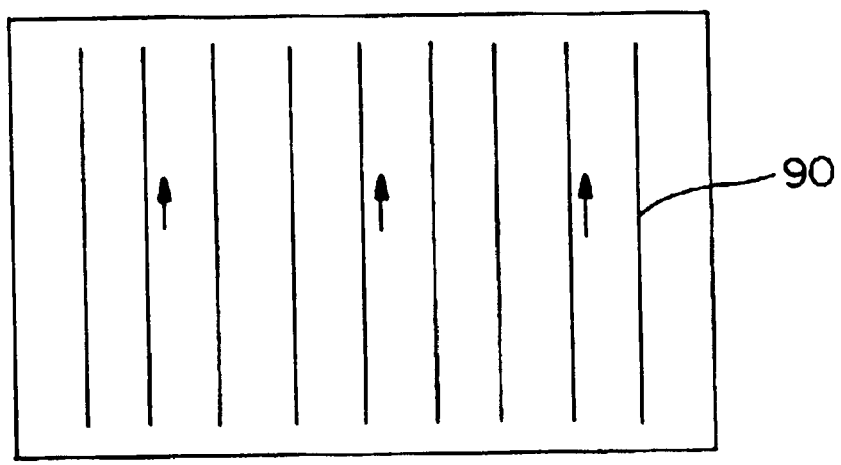
FIG. 8A shows a top view of a sensor with the conductor sets all having current flowing in the same direction.
Figure 8B:
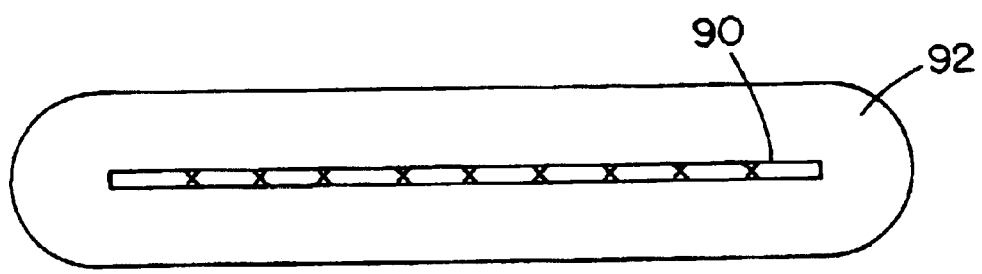
FIG. 8B illustrates a cross section of the conductor sets and the spatial wavelength.

FIGS. 8A and 8B show a sensor that has a plurality of conductor sets formed of wire. Each conductor set has the same number of wires. The current in each conductor set 90 is flowing in the same direction, up the page as seen in FIG. 8A and into the page as seen in FIG. 8B. The result is a uniform field in the central sensing region where spatial wavelength is essentially infinite. The spatial waves have been predominately described above as having a sinusoidal shape. It is recognized that other spatial waves may be desired in certain instances such as saw tooth waves, square waves, pulsed, and impulse. The width of the spatial wave can also vary. The wave can likewise increase or decrease as the wave progress over the sensor.

The MWM sensor is driven by an AC current and its response is measured by an impedance analyzer. In a preferred embodiment, a circuit board-level, multi-frequency impedance instrument having a range of 250 KHz–2.5 MHZ is used. The response is compared to the continuum models. The sensor response which is in the terms of impedance phase and magnitude is converted into material properties or conditions of interest, such as conductivity and proximity. Proximity is the average distance between the winding plane and the surface of the conducting buried object.

In addition to permitting precise determinations of material properties, the MWM modeling software also incorporates methods to identify operating conditions that provide maximum sensitivity and selectivity (the ability to measure two or more properties independently), without running extensive experiments. The identification of operating condition is described in further detail in U.S. Pat. No. 5,015,951 titled "Apparatus and Methods for Measuring Permeability and Conductivity in Materials Using Multiple Wavenumber Magnetic Interrogations" which issued on May 14, 1991 and a U.S. patent application Ser. No. 08/702,276 titled "Meandering Winding Test Circuit" and filed on Aug. 23, 1996, the entire contents of which are incorporated herein by reference.

Once an object is detected, the depth below the surface, and the size and shape of the object need to be ascertained in order to determine how to proceed. For example, if it is determined that the object is an intact mine or bomblet, the object needs to be marked, disarmed or removed. However, if it is determined that the object is fragment or debris, the object could be left.

One of the keys to discrimination will be determination of depth of an object of unknown size. For example, a small metal object located near the surface may be detected by more than one sensing element, as would a large object located far from the surface. Thus, to differentiate between these objects, depth information is required. Using model-based MWM grid measurement algorithms, the depth of a metallic object detected by an individual secondary (sensing) element can be determined. Also, an object's size and shape can be determined by combining information about the proximity of the object to the sensing elements with the number and location of the sensing elements that detected the object. Additional information may also be provided by the magnitude and phase of the detection signal at different input current frequencies, and for different sensing element orientations. This additional information is used to increase detection sensitivity and to improve clutter suppression.

MWM can discriminate the location and the properties of the object by using some or all of the following approaches: (1) Spatial imaging; (2) Grid measurement algorithms; (3) Spectral analysis, spatial and temporal; and (4) a scanning or roving sensing element. The roving sensing element can be oriented either in a parallel or perpendicular plane to the MWM primary.

Spatial imaging approaches utilize the orthogonal array of secondary windings to provide spatial resolution and permit discrimination and analysis of multiple indications. The array output is operated upon by a logic module which applies the above analysis and is then used to drive a visual output display, discussed below, or an auditor signal to the operator. The visual display will provide the interface with the system operator.

Grid measurement algorithms permit the integration of impedance measurement data at multiple frequency, multiple winding spatial wavelengths, and multiple lift-offs (by moving the MWM sensor or using a roving sensing element). This integration is used in conjunction with the array calibration discussed below. The result is a multi-dimensional clutter suppression and bomblet identification algorithm that will provide robust, reproducible, and high confidence bomblet discrimination capability. It provides real-time (fast) measurements, enabled by table look-up from stored measurement grids.

Measurement grids are tables produced by the continuum models of the MWM and in a preferred embodiment are graphically displayed. The measurement grids are used to convert the MWM impedance magnitude and phase measurements into material properties or material proximity. The real-time table look-up process is described in U.S. patent application Ser. No. 08/702,276 which is titled "Meandering Winding Test Circuit" which was filed on Aug. 23, 1996, the entire contents of which is incorporated by reference.

The grid measurement approach allows for detection and discrimination of various objects including various types of landmines and bomblets containing metal and other unexploded ordinance. The measurement grids also provide a unique tool for rapid field calibration of sensing arrays.

To generate measurement grids, the material conductivity (or other property of interest) is first estimated using calibration standards or values from the literature. (This estimate merely serves to define the general region of interest in which to run the models to generate predicted sensor response.) The continuum models of the MWM then predict sensor response, in terms of phase and magnitude, using the selected ranges of conductivity and proximity (lift-off). This type of grid is composed of lines of constant lift-off intersecting lines of constant conductivity. These grids are generated off-line and then provide a real-time (fractions of a second) measurement capability in the field.

Figure 9A:
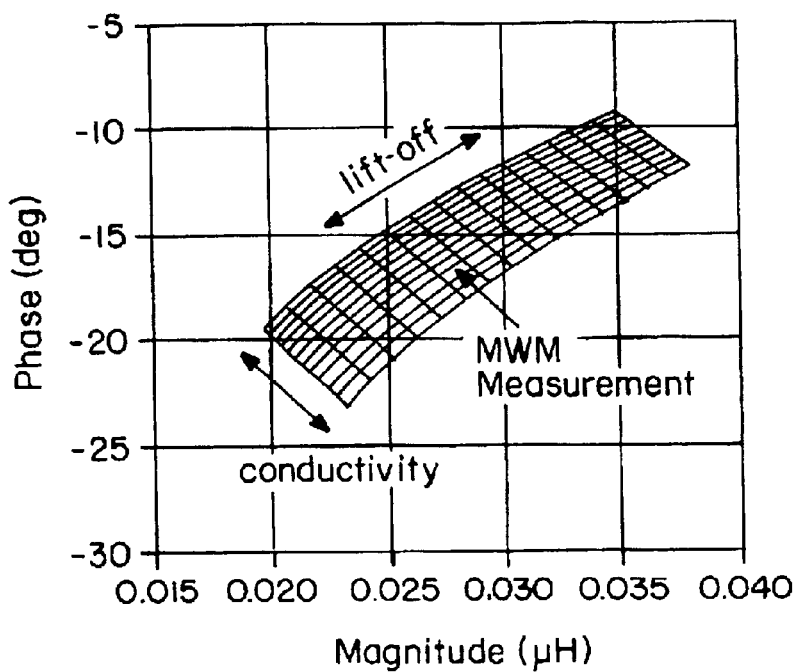
FIGS. 9A and 9B illustrate conductivity lift-off grids for (a) Aluminum and (b) Carbon Steel.
Figure 9B:
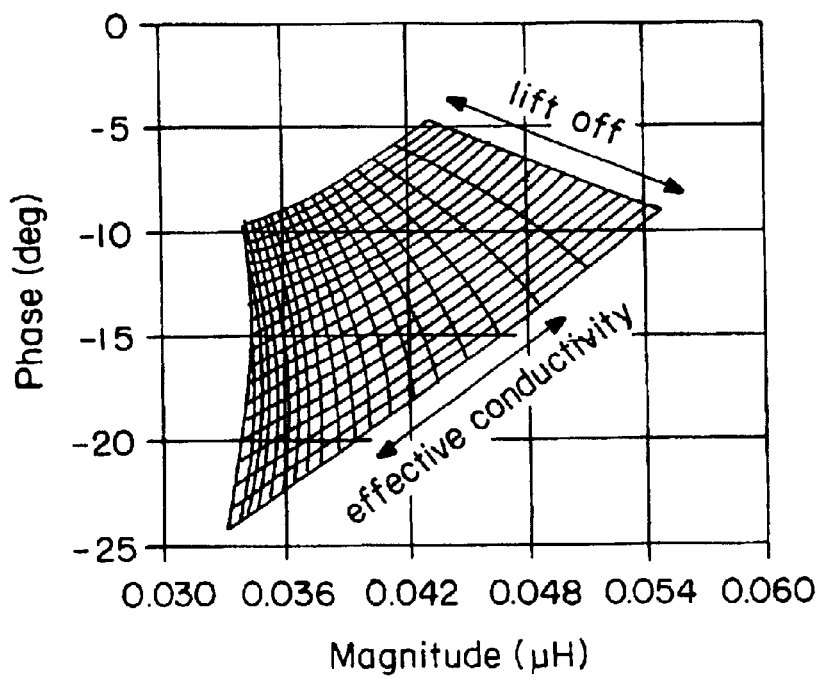

FIGS. 9A and 9B illustrate measurement grids for aluminum and carbon steel. Note that the lift-off lines for aluminum are practically perpendicular to those of carbon steel. This offers a very direct approach for discriminating between steel and aluminum: simply vary the sensor lift-off (i.e., move it up and down relative to the ground) and observe the orientation of the lift-off line. This will provide a simple but effective filter for eliminating aluminum objects, such as discarded containers, and other nonferrous metals from further consideration during bomblet discrimination. The system operator would only be required to move the sensor head vertically over an indication, while the software compares the lift-off response for the detected object to the stored lift-off response (in the measurement grid) generated off-line and calibrated for an intact bomblet.

Spectral analysis approaches involve operating MWMs of several spatial wavelengths at various excitation frequencies to provide more information about the sensed volume. The additional information from multiple grids obtained at different MWM spatial wavelengths and at multiple input current temporal frequencies can be used to determine the material type, size, depth and case thickness of the sensed object, as well as to further define and constrain the bomblet or landmine "signature", and improve clutter suppression and bomblet detection performance.

The scanning or roving sensor involves maneuvering a movable secondary winding (or electrode in the case of the dielectrometers) within the field of a fixed primary winding. This is an alternative approach to the use of multiple sensing elements to provide spatial imaging for discriminating intact bomblets.

The combination of MWM design and operational features with the grid measurement approach provides redundant paths to solution of the bomblet discrimination problem. Table 1 lists the system features and the information produced by each to support bomblet discrimination and clutter suppression. Each one of the four key attributes required to fully characterize an intact bomblet (size, shape, depth and material) can be generated by at least two of the system design or operational features.

TABLE 1

Bomblet discrimination features produced by MWM-Array System

| SYSTEM OR OPERATIONAL FEATURES | DISCRIMINATOR |
| --- | --- |
| Secondary winding array* | Size, shape, depth |
| Multi-frequency measurements* | Material, size, depth |
| Multiple spatial wavelengths* | Depth |
| Multiple proximity measurements* | Material, size, depth |
| Rotating sensor head | Shape |

*When combined with measurement grids.

The information gathered by the sensor needs to be displayed or disclosed to the user quickly and efficiently. The goal is to process the data and present the result in an unequivocal way that requires minimal operator interpretation. This will greatly reduce the training required for the user or operator.

A sensor array output may be located directly above the sensor. The display could be LED, LCD or other display device. The display is driven by two sensing elements, one in each of the orthogonal arrays. An LED is illuminated if both its associated sensing array elements detect a metallic object. An alternative embodiment to the sensors located directly above the sensor is a display located closer to the users.

Dielectrometer Sensor

While the magnetoquasistatic detection using the Meandering Winding Magnetometer is capable of determining location, shape and orientation of metal, the MWM sensor is not capable of detecting plastic or other non-conducting objects within the ground. There exist many land mines that have very low metal content. Even if the MWM sensor was able to detect the metal, the size, shape and orientation of the metal detected would not allow the user of the sensor to ascertain whether the metal was or was not part of a land mine.

The second sensing capability, the dielectrometer, capacitive sensor is capable of detecting subsurface plastic as described below. The dielectrometer, capacitive sensor senses the dielectric properties of the material.

The dielectric properties of a material can be described by two parameters, the permittivity and conductivity. The permittivity describes the displacement current density produced in the material by an applied electric field, whereas the conductivity describes the conduction current density. The dielectric properties of materials vary significantly and can provide a means for identification of materials.

It is convenient to represent the complex permittivity of a material as $\epsilon^* = \epsilon' - j\epsilon''$, where $\epsilon'$ is the real part and $\epsilon''$ is the imaginary part of the complex permittivity. The real part is the dielectric constant of the material ($\epsilon' = \epsilon$); whereas, the imaginary part ($\epsilon'' = \sigma/\omega$ where $\sigma$=conductivity and $\omega$=angular frequency of the electric field) describes the power dissipation in the material (loss). The dielectric spectrum of a material is a representation of its complex permittivity, expressed as a function of frequency. The dielectric spectrum provides a unique signature of a material in a particular state.

Classical dielectrometry extracts information about the state of a material construct from its dielectric spectrum. The application of a sinusoidally varying potential of complex magnitude V and angular frequency $\omega = 2\pi f$ results in the flow of a terminal current with complex amplitude I, whose magnitude and phase is dependent on the complex permittivity $\epsilon^*$ of the material.

Figure 10A:
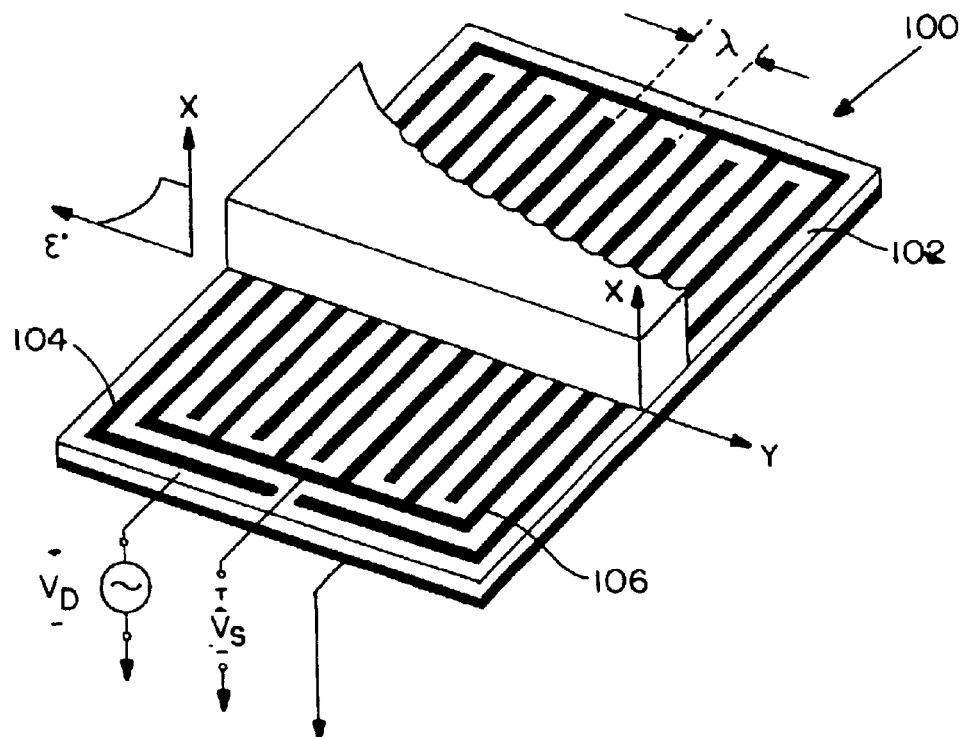
FIG. 10A illustrates interdigitated electrode dielectrometer (IDED) sensor.

A capacitive sensor 100 in one preferred embodiment is an interdigitated electrode dielectrometer (IDED) sensor 102 such as presented by Melcher et al. in U.S. Pat. No. 4,814,690, "Apparatus and Methods For Measuring Permittivity in Materials. The IDED 102 utilizes a pair of interdigitated electrodes 104 and 106 to produce a spatially periodic electric field. A typical arrangement of such electrodes is shown in FIG. 10A.

The electrodes are adjacent to the material of interest with an insulating substrate and a ground plane on the other side of the substrate. One of the two electrodes, 104, is driven with a sinusoidally varying voltage, $v_D$, while the other, 106, is connected to a high-impedance buffer used to measure the magnitude and phase of the floating potential, $v_S$. The periodicity of the electrode structure is denoted by the spatial wavelength $\lambda=2p/k$, where k is called the wavenumber.

Figure 10B:
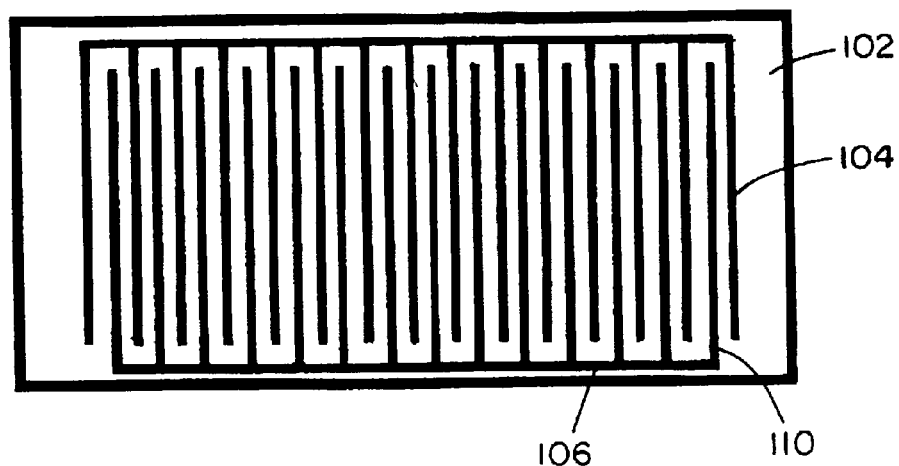
FIG. 10B illustrates a plan view of the IDED sensor.

A plan view of the IDED sensor is seen in FIG. 10B. The driven electrode, an excitation electrode 104, has a plurality of fingers 108. The other electrode 106, the electrode connected to the high-impedance buffer and referred to as a sensing electrode, has a plurality of fingers 110. The fingers of the two electrodes are interdigitated on the sensor face, such that fingers of the first electrode and the second electrode alternate across the sensor face.

One inherent benefit of the IDED structure is that the coupling of the applied field into the medium can be achieved from a single surface. Dielectric measurements of thin films, for example, can be performed without having to deposit a metal electrode to the exposed side of the sample.

The depth of sensitivity of the sensor is determined by the electrode spacing. The electric scalar potential in the dielectric above the sensor in FIG. 10A obeys Laplace's equation and in a Cartesian geometry with a linear lossy dielectric the solutions are of the form:

$$\Phi=\Phi_0 e^{-kx}[A \sin ky + B \cos ky]$$

This indicates a general property of solutions to Laplace's equation: if the excitation is periodic in space, the potential decays in the perpendicular direction with a penetration depth into the unknown dielectric equal to the spatial wavelength of the spatially periodic excitation.

Figure 11A:
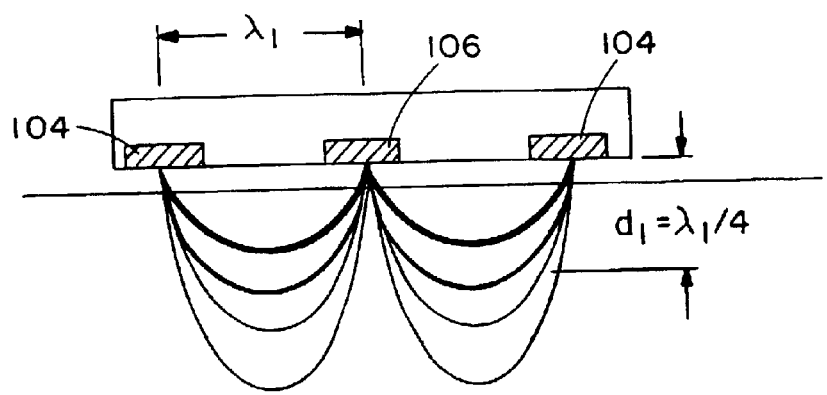
FIGS. 11A and 11B show two IDED sensors with different electrode spacing illustrating that the spacing effects the sensitive to different depths into the material under test.
Figure 11B:
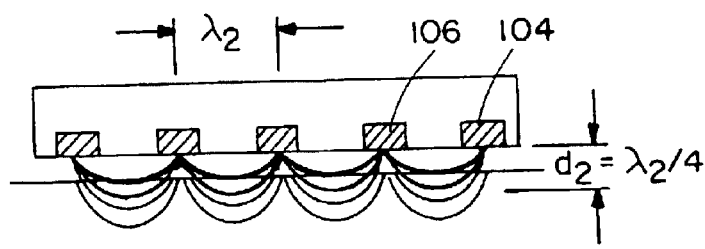

An IDED is sensitive to material within a distance (from the electrode plane) of up to one third to one half of the spacing between electrodes. Sensors with different electrode spacing will consequently be sensitive to different depths into the material under test, even when operated at the same excitation frequencies as illustrated in FIGS. 11A and 11B. For heterogeneous media, spatial profiles of dielectric properties can be determined using multiple wavelength sensors, as each wavelength has a unique penetration depth into the heterogeneous dielectric.

The magnitude and phase of the measured signal from an IDED sensor depend on the sensor geometry and the dielectric properties of the materials in proximity to the sensor. The sensor geometry and the dielectric properties of the materials determine the complex admittance of the sensor, i.e., the ratio between the current and the voltage between the two electrodes.

Figure 11C:
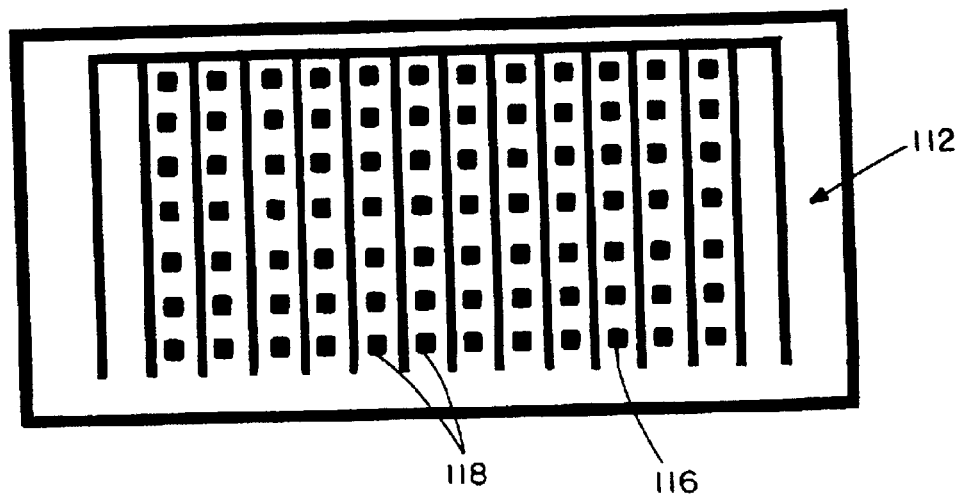
FIG. 11C illustrates an IDED sensor with an array of sensing electrodes.

FIG. 11C illustrates an IDED sensor 112 with an array design. The sensing electrode 116 is formed of a multiple of elements 118. Individual elements can be selected to locate the position of the underground object.

The admittance can be calculated from the complex surface capacitance density C, defined as $C=\in^* E_x/\Phi$, where $E_x$ is the electric field in the x direction. The spatially periodic potential $\Phi$ is derived from the voltage between the electrodes. The current in the sensing electrode can be determined by integrating the quantity $\in^* E$ over the area of the electrode. Therefore all the information about the material structure is contained in the surface capacitance density.

When a single uniform layer whose thickness is much greater than the electrode wavelength is present, C can be derived by solving Maxwell's equations in the electroquasistatic case to be $C=e^*k$, where k is the spatial periodicity wavenumber.

Figure 12:
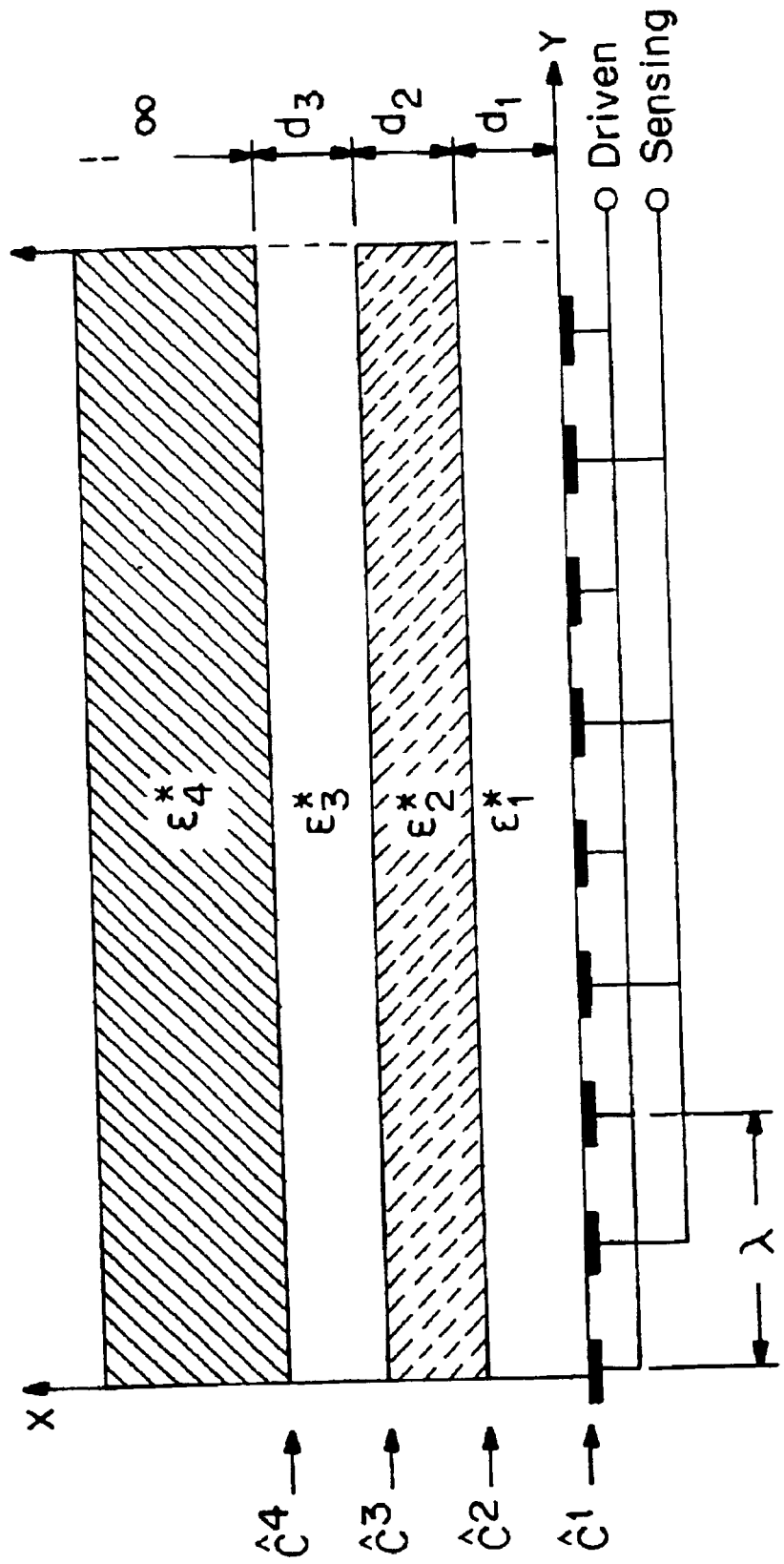
FIG. 12 illustrates the IDED characterization of a multiple layer material.

When more than one layer is present, such as when an air gap exists between the sensor and the soil surface, the surface capacitance density at the electrode surface is calculated by sequentially deriving C at all material interfaces, beginning with the topmost layer as illustrated in FIG. 12. For every layer, if C is known at the upper surface, it may be calculated for the lower surface (also from Maxwell's equations) as a function of $e^*$ and thickness, d, of that layer. Using this approach, the air layer between the sensor and the soil surface is taken into account.

The multiple-wavelength approach to property profiling uses IDEDs with different spatial wavelengths to measure complex permittivity variations with depth at a particular location on the component surface. Each sensor element of the multiple-wavelength IDED produces a measurement which corresponds to a depth of material that is proportional to the wavelength of that particular element. The element with the shortest wavelength will respond to the dielectric properties of the material closest to the surface, whereas the longer-wavelength elements will be sensitive to the material below that as well. Thus, the complex permittivity profile of the material can be determined from measurements made with multiple-wavelength IDEDs. This is described in further detail in U.S. Pat. No. 4,814,690 titled "Apparatus and Methods for Measuring Permittivity in Materials" which issued on Mar. 21, 1989, the entire contents of which are incorporated herein by reference.

The ability to independently vary the applied frequency and the spatial wavelength of the electrodes allows one to measure both the temporal and the spatial frequency response of the material. The temporal response, or dielectric spectrum, is obtained by varying the excitation frequency, and the spatial response is obtained by varying the spatial wavelength of the sensor. Because the temporal ($\omega$) and spatial (k) domains are independent, this technique has been referred to as the 'imposed $\omega$–k' approach to dielectrometry.

One of the features that differentiates this approach from classical techniques utilizing single wavelength structures is the fact that the heterogeneity of the material under test can be deduced independently from the temporal frequency response. This can be achieved by performing variable spatial wavelength measurements at the same temporal frequency. The spatial distribution of the dielectric properties can thus be determined without making assumptions about the nature of the material. This additional freedom allows an unconstrained evaluation of the physical mechanisms that govern the dispersive nature of the dielectric properties.

Quasistatic indicates that the frequency of excitation is sufficiently small such that the propagation of electromagnetic radiation over the area of interest is approximately instantaneous and therefore approximately obeys a simplified version of Maxwell's Equations in which either electric or magnetic fields are of primary interest. In the case of this sensor it is the electric fields which are of primary interest and it is the coupling of electrodes through these electric fields which is termed capacitance. Since the sensor uses this coupling to probe for materials of varying dielectric properties such as landmines, the term capacitive has been used to describe the sensor.

An alternative embodiment to the interdigitated electrode dielectrometer (IDED) sensor is a sensor that has a single sensing electrode, or a single location for a sensing electrode, and excites only one period of the electric field. This design is more appropriate for non-portable sensors. A multiple wavelength (periodic) version of this sensor could be used for vehicle mounted applications.

Figure 13:
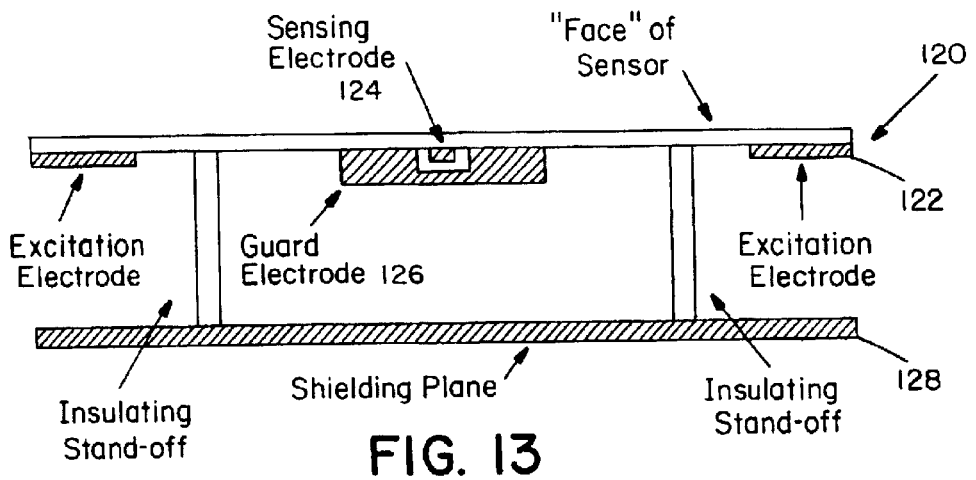
FIG. 13 illustrates a single sensing electrode IDED sensor.

The basic single sensing electrode sensor 120 design as illustrated in FIG. 13 consists of two excitation electrodes 122, a sensing electrode 124, a guard electrode 126 and a shielding plane 128.

The excitation electrodes 122 are driven by a high voltage source which is typically sinusoidal (500V peak in experiments). Electric field lines emanate from the excitation electrodes and fringe through the half-space above and below the face of the sensor, terminating on the shielding plane 128, guarding electrode 126 and sensing electrode 124. In the preferred approach, the primary sensing electrode 124 is held at a voltage potential equivalent to that of the shield and guard, which is typically a ground reference, while the current required to maintain this sensing electrode voltage is measured. Alternatively, the sensing electrode could be allowed to float, its voltage being detected. Keeping both the sense electrode and shield/guard electrodes at identical voltages effectively eliminates the capacitive coupling between these electrodes. Such coupling can result in signal attenuation and sensitivity loss, since it is the coupling between the sense electrode and excitation electrodes that is of interest.

The ratio of excitation voltage to the current flowing to and from the sensing electrode, also known as the transimpedance, is then used as the sensor output. The output is compared with the response from both finite element and analytical models of the sensor and its surroundings to determine material or geometric properties of the surroundings. The output during scanning is compared with the output with no buried objects present when used to detect changes in the surroundings over position or time.

The overall structure is driven by the desire to induce dielectric polarization in materials which are not locatable directly between electrodes, but rather materials which are in a half-space region separated from all electrodes in the adjacent half-space. In order to accomplish this, fringing electric fields are setup by electrodes held at two different voltage potentials and placed in the plane separating half-spaces. The use of two excitation electrodes at the same potential adds a degree of symmetry to the fields, while placing the sensing electrode at the center eliminates disturbances from unwanted interference as a result of the protection from the shielding plane. The use of a single excitation electrode permits deeper sensor penetration with the same size footprint. In terms of electric field distribution, the sensing electrode and guard shield can be viewed as a single electrode since they are at the same voltage potential. The spatial distribution of the fringing fields is then primarily determined by the excitation electrode and sense/guard shield electrode size and position in the plane of the sensor face.

From closed form 2-D Laplacian solutions for electric fields with periodic boundary conditions it is known that the electric field intensity will decay into the half-space possibly containing the landmine. It is also known that boundary conditions on potential having lower spatial frequencies will result in a slower rate of decay of electric field intensity with distance from the electrode plane. This fact is utilized in the aperiodic structure by separating excitation and guard/sense electrodes until practical sensor size limitations are reached, thereby increasing the low frequency spatial spectral content of the boundary potential at the sensor's face. The gap between electrodes and electrode widths have been chosen so that the potential at the boundary approximates that of a single period of a sinusoid in order to minimize higher spatial harmonics which will cause an undesirably faster decay of the relative electric field intensity. Placing the shield plane too close to the face of the sensor also tends to create higher order harmonics and is therefore placed as far as practical from the sensor face. All of these efforts are aimed at increasing the relative electric field intensity as deep as possible into the half-space being probed. However, having sufficient field intensity at a desired probing depth into the half-space is necessary but not sufficient in being sensitive to the materials located there. Further attention must be given to the design of the sense electrode and guard.

Figure 14:
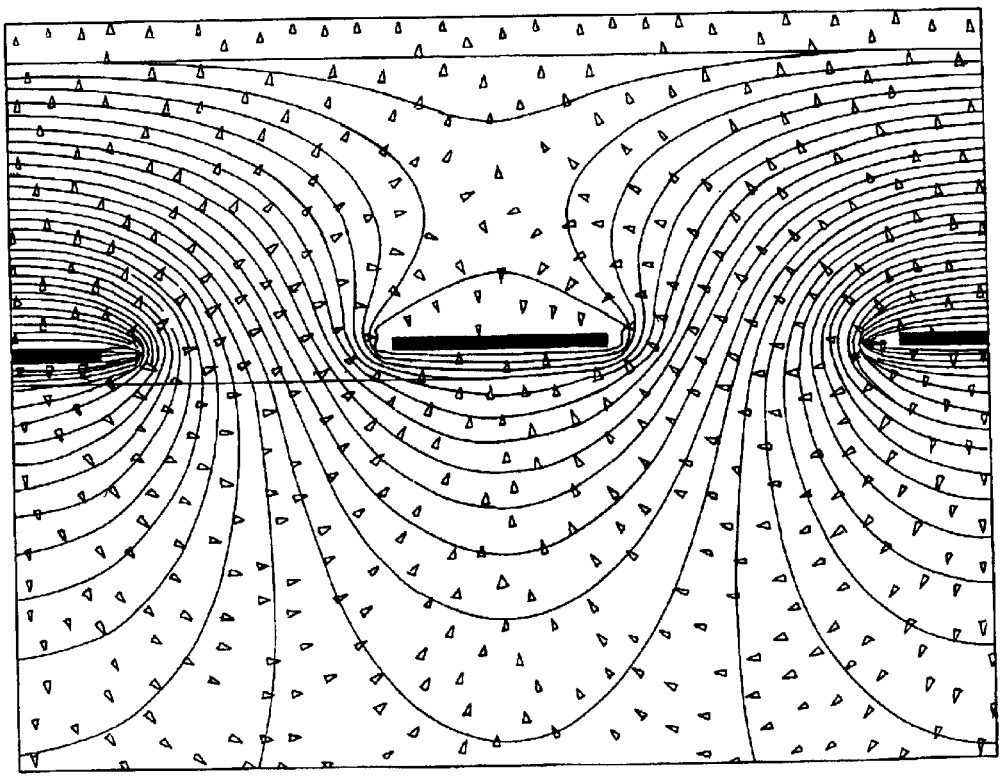
FIG. 14 illustrates the equi-potential lines and electric field lines of sensor cross-section.

Referring to FIG. 14, the electric field distribution of an dielectrometer sensor illustrates several factors which the placement of elements increase sensitivity. Electric fields exist in both the half-space being probed and the region between the guard/sensor and the shield plane. The electric field lines between the guard/sensor and the shield plane primarily terminate on the side of the guard electrode opposite the half-space being probed. The termination of these field lines contribute to the total current flowing to and from the guard/sense electrode; however, this portion of the current is insensitive to the region being probed. The placing of the guard electrode parallel to the sense electrode and opposite the region being probed eliminates the current flow to the sense electrode on the side between the sensor face and the shield plane, resulting in a greater sensitivity of the current to the region being probed.

Still referring to FIG. 14, it can be seen that field lines with the shallowest penetration terminate on the outer edges of the guard/sense electrodes, while field lines with the deepest penetration terminate in the middle of the electrodes. It should also be noted that the density of field lines terminating on the electrode tends to decrease with increasing depth of penetration. This is due to the fact that the electric fields inherently decay with distance from their charge sources. As a result, the sensitivity of the measured current flowing in and out of the sense electrode is inherently biased toward near properties rather than deep properties. In order to counter this effect the sense electrode has been reduced in width so that only deep penetrating field lines terminate on it, increasing the sensitivity of the measured current to deep effects. The guard electrode replaces the parts of the sense electrode, which were reduced in order to maintain the low spatial spectral frequency components.

Figure 15A:
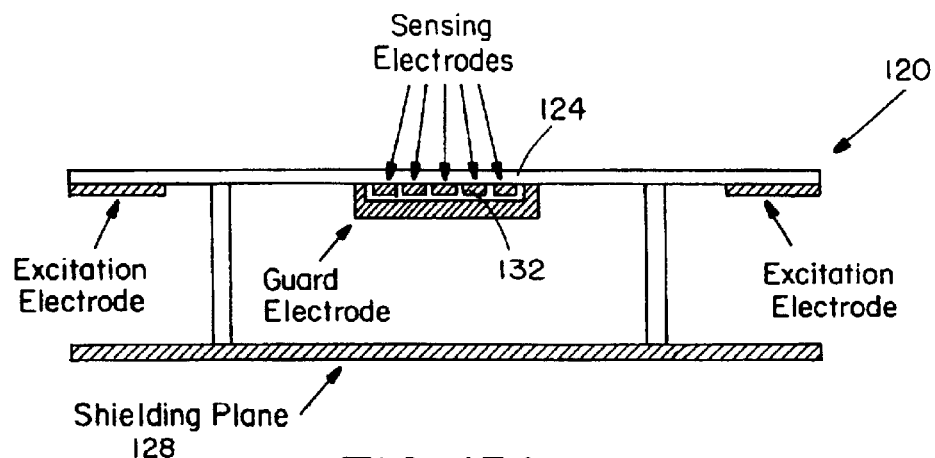
FIG. 15A is a cross section of a sensor with multiple sensing elements positional side-by-side for multiple depths.

Additional imaging capability may also be achieved by further breaking the original single sensing electrode 124 in separate parts as shown in FIG. 15A, giving further information about depth of objects in the half-space being probed. This sensor 120 utilizes a single column of a plurality of sensing side-by-side elements 132. In preferred embodiments, there are three or five elements. As can be seen from FIG. 14, the center sensing electrode of FIG. 15A senses the longest and deepest spatial half wavelengths, while end electrodes sense shorter, shallower half wavelengths.

Figure 15B:
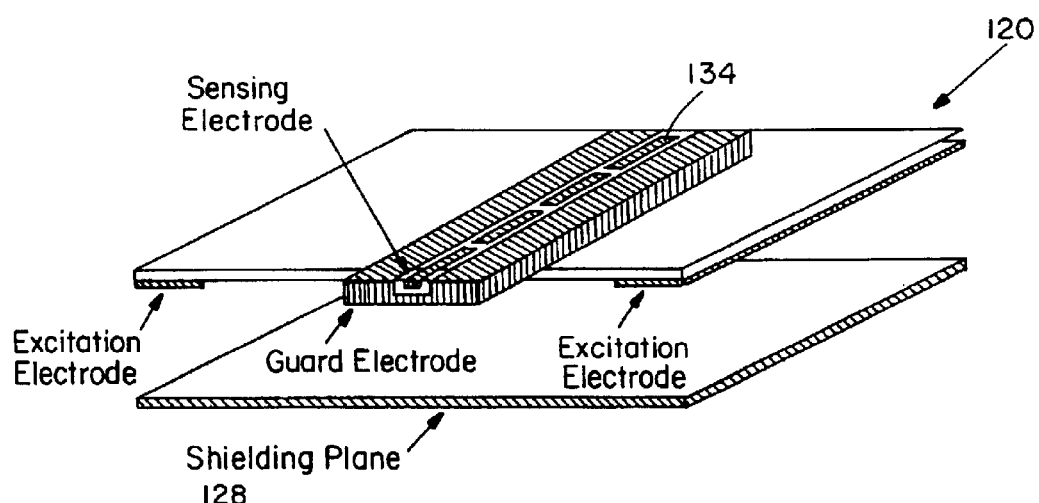
FIG. 15B is a perspective view of a sensor with a multiple sensing elements positioned in-line.

Breaking the sensing electrode up into separate elements along what has been the depth of the cross-section as depicted in FIG. 15B, allows for imaging of the half-space being probed. This sensor 120 utilizes a single row of four sensing elements 134 surrounded by the guard electrode 126. A pair of drive electrodes are located on either side. The four sensing electrodes can be connected differently such that three outputs are produced which are proportional to differences in adjacent electrodes. In a preferred embodiment numerous (e.g. 20 sensing elements will be used in a row to increase image resolution). Without the side sensing elements of the previous embodiments, this sensor does not include air gap compensation capability. When the output of each element is directly used as information in building an image, results similar to scanning a single element will be obtained. The array of elements excels when utilized with additional circuitry, which differences the measurements from adjacent or alternating elements. Differencing the elements allows for additional sensitivity to small, but spatially abrupt (with respect to the spacing of the elements being differenced) changes in the dielectric properties in the half-space, as is the case when searching for objects such as landmines. With the sensor stationary a one-dimensional image is formed by numerically integrating the measured differences after their conversion from analog signals to digital values. By scanning the array in a direction perpendicular to the line of array elements two-dimensional images may be formed by combining the one-dimensional image at each position of the scan. Here incorporating an absolute measurement (i.e., not differential) of one or more of the elements at each scan position can be useful in accounting for variations in the sensor lift-off when scanning over a surface. Additional information from electrodes sensitive to properties at various depths as described in the previous section may also be incorporated for improved object discrimination and three-dimensional imaging. A full two dimensional array combining the features of FIGS. 15A and 15B may also be provided.

Figure 15C:
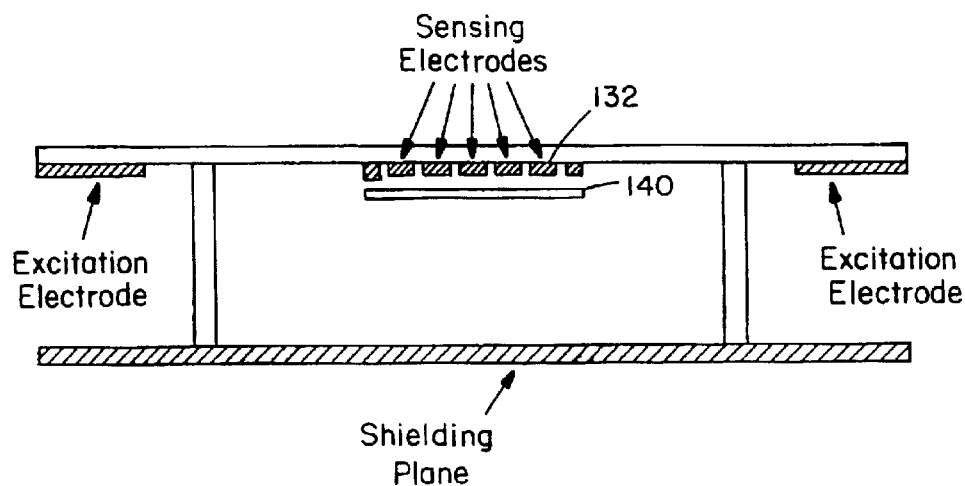
FIG. 15C is a cross section of a sensor having a guard plate.

FIG. 15C illustrates an alternative embodiment to the sensor of FIG. 15A. The sensor has a guard electrode 126 which surrounds the side-by-side elements 132 on the same plane. A separate guard plate 140 overlies, underlies as seen in FIG. 15C, the sensing electrode and the guard electrode. The guard plate is electrically connected to the guard electrode.

Figure 16:
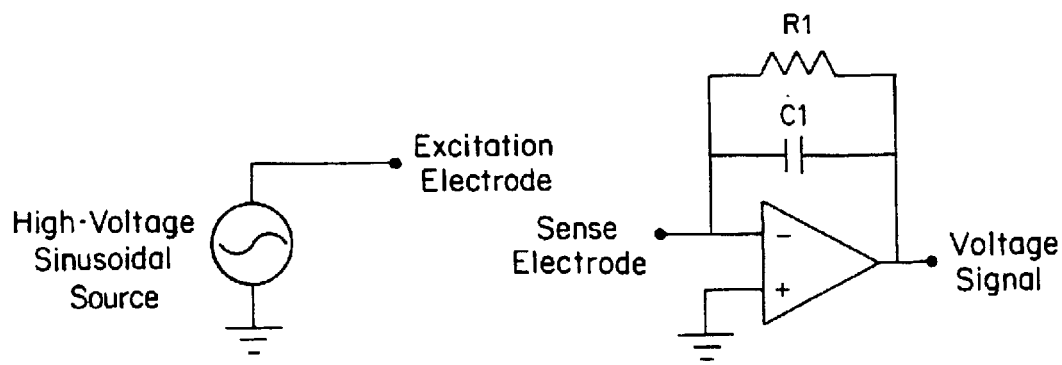
FIG. 16 is a simplified schematic of the detector drive and the feed back sensor.

The input-stage of a circuit for measuring the current flowing in and out of the sense electrode, while maintaining a virtual ground potential, is shown in FIG. 16. It includes an electrometer grade operational amplifier in a current integration configuration. The current integration configuration is preferred over the common transimpedance amplifier consisting of a resistor in the feedback loop rather than a capacitor. This is primarily due to the relatively small current being measured and the relatively large resistor which would be required. The resistor in the feedback loop serves only to bleed charge off of the integration capacitor to avoid saturation from static electric fields and amplifier bias currents. The RC time constant of R1 in parallel with C1 is set such that the break frequency is less than the excitation frequency, but the time constant is fast enough to allow a fast decay of accumulated charge from stray static fields at the sensor electrode when scanning.

In the case of an array of elements used in differential mode, each element would utilize one of the previously described circuits. The output from pairs of circuits from adjacent or alternating elements would then be fed into a common difference amplifier providing a single output for each pair of electrode.

A test of the sensor shown in FIG. 15B was conducted. A land mine specimen of interest (M14) was buried to the desired depth in the sand bed. For this test a scanning mechanism for the test bed was created. The sensor data acquisition system was initiated and the scan motor was energized. The data acquisition system automatically records the differential sensor outputs (the difference between adjacent sensing elements).

The data produced during a scan consists of an array of data points, four elements wide by about 200 elements long. In the preferred embodiment numerous (e.g. 20 or more) elements will be used and rapid scanning (e.g. 1 ft/sec.) will be provided. This data can be used to create an image by connecting data points of equal value with contour lines, as a topographic map uses contour lines to connect points of equal elevation. Intermediate values can be developed by interpolation to increase contour line density.

Figure 17A:
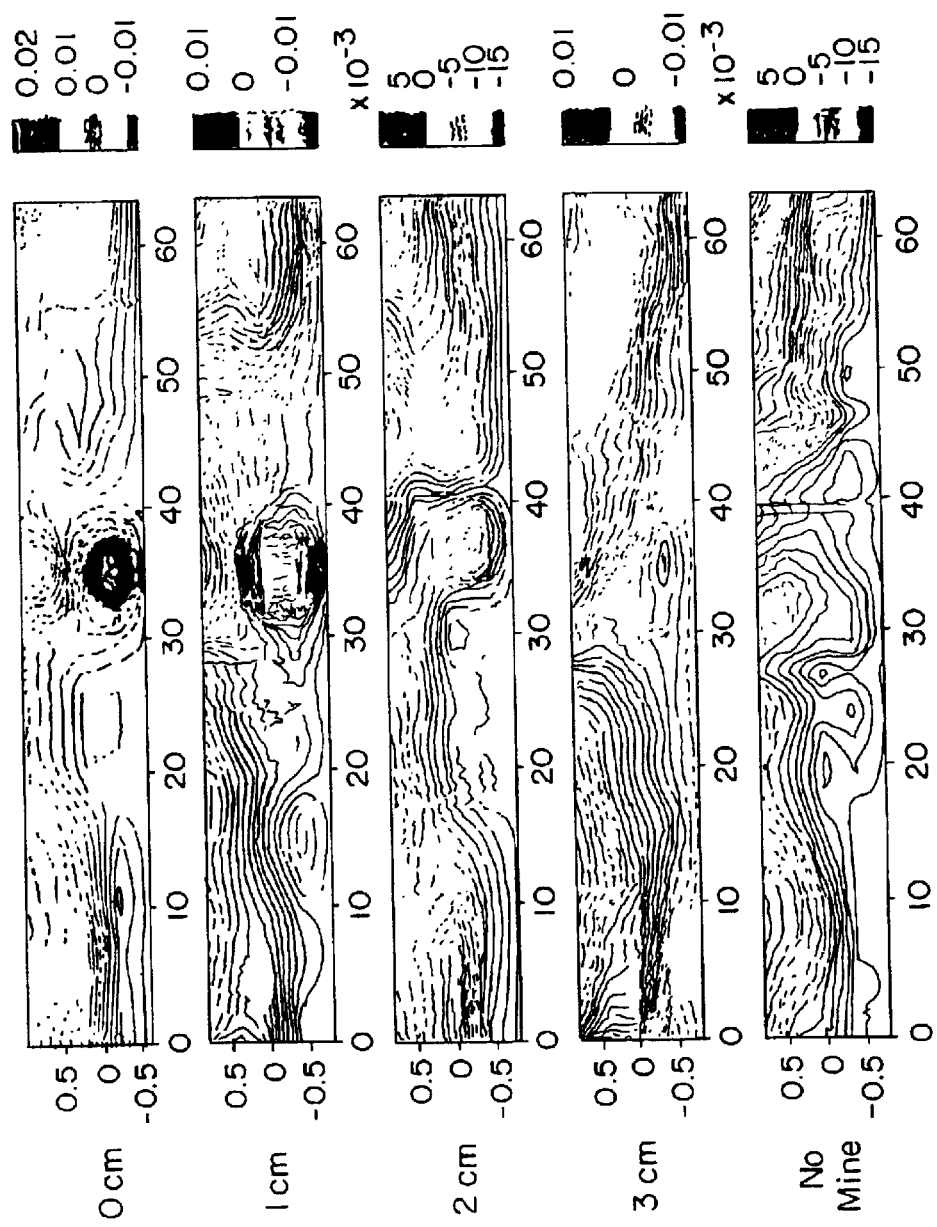
FIG. 17A shows the scanning results of the sensor shown in FIG. 16 with a plastic mire buried in sand to increasing depths.

FIG. 17A illustrates the results of a sequence of scans conducted with the inert M14 mine buried at increasing depths in the sand bed. The data shown is raw data that had not been processed to remove air gap effects. Future signal processing efforts would substantially improve the quality of mine images produced by the capacitive sensing array. In the top scan the top of the mine is at the surface of the sand. In the second scan down, the top of the mine is buried to a depth of 1 cm below the surface, and so on.

The mine can be clearly seen at up to 2 cm depth in the images produced. Not only are the sensor capacitance values significantly affected by the presence of the mine, but also the gradient from unaffected values is quite steep. It is recognized that pattern recognition techniques such as edge detection can be used to discriminate mines from clutter. This data was taken at a single frequency. Once a target is detected, multiple frequencies are used for false alarm rejection and discrimination/identification of mines. For example, dielectric spectroscopy can permit discrimination between plastic and rocks.

Figure 21A:
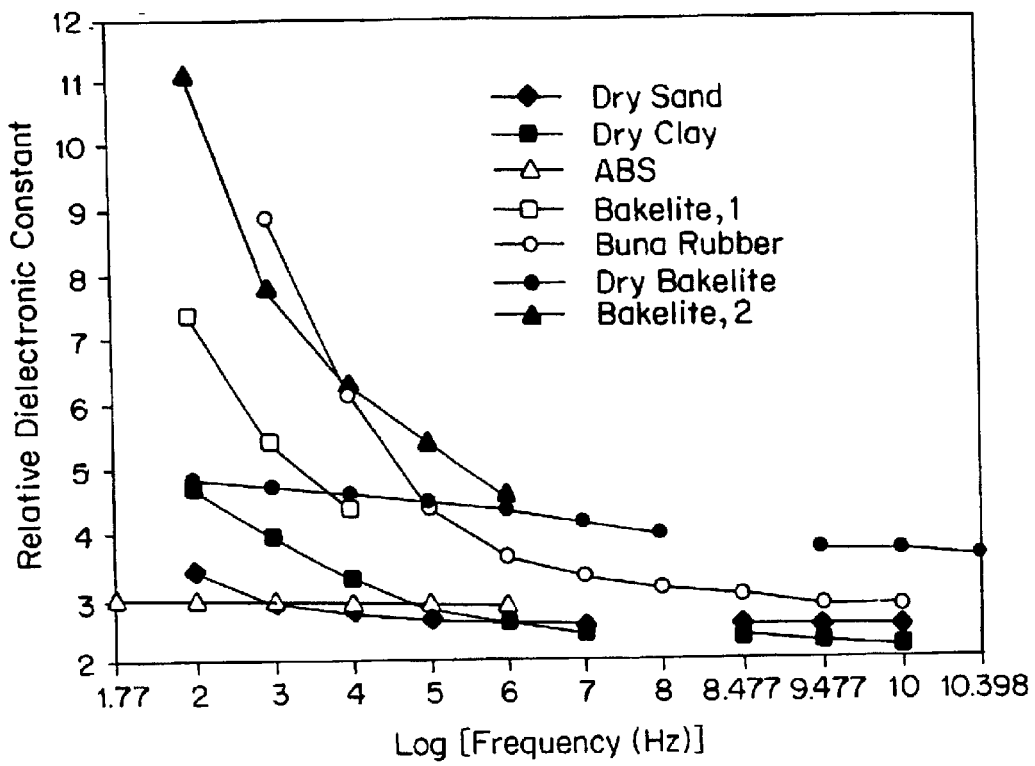
FIG. 21A illustrates that the dielectric constants of mine materials and soils converge at higher frequencies and diverge at lower frequencies.
Figure 21B:
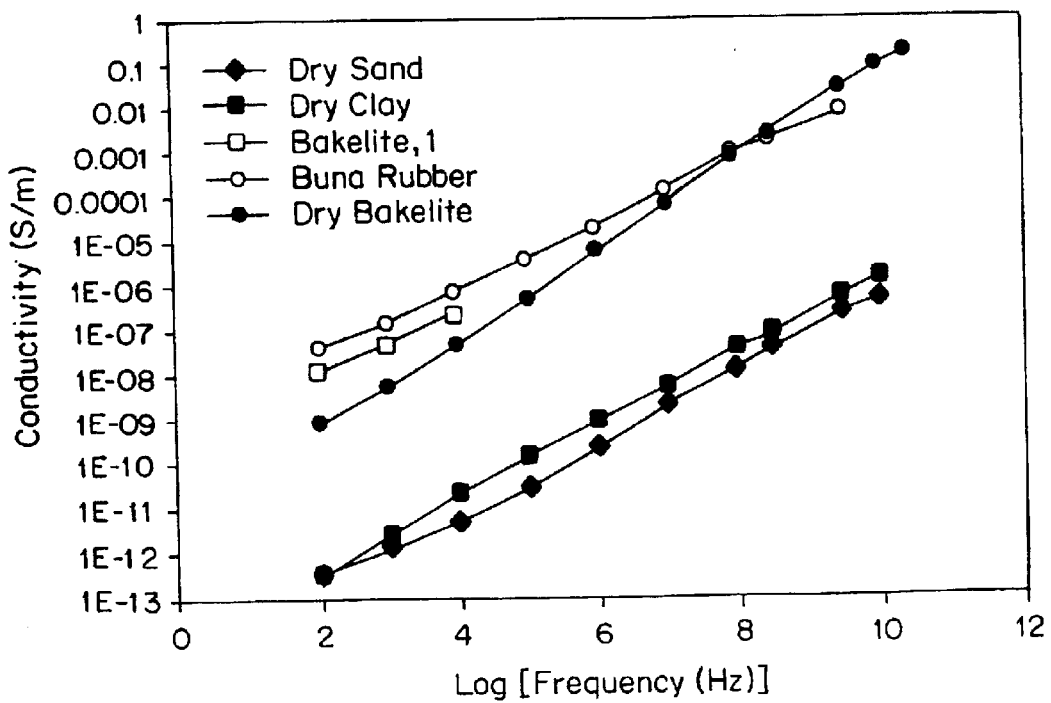
FIG. 21B illustrates that conductivity is frequency dependent for soils and plastic mine materials and much higher at high frequencies.

FIGS. 21A and 21B show the dielectric constant and conductivity variations with frequency for several materials. This shows that a great deal of information is available in the quasistatic frequency range under 100 MHZ compared to the 1–10 GHz range that ground penetrating radar operates.

Figure 17B:
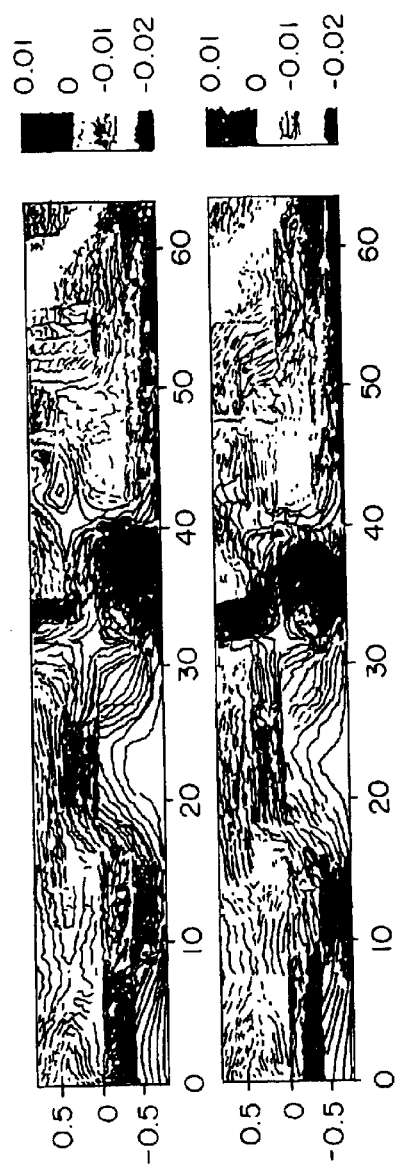
FIG. 17B shows the scanning results conducted at different times.

Tests were also conducted to evaluate system repeatability over time. FIG. 17B illustrates the results of scans conducted approximately three hours apart. These scans were conducted with the M14 mine at a depth of 1 cm. Sensor and system response to the mine and the surrounding sand bed is extremely repeatable.

Figure 17C:
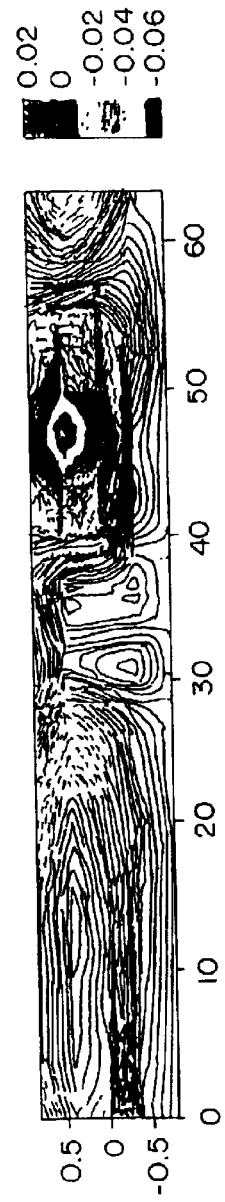
FIG. 17Ca shows the scanning of a mine and a rock.
Figure 17C:
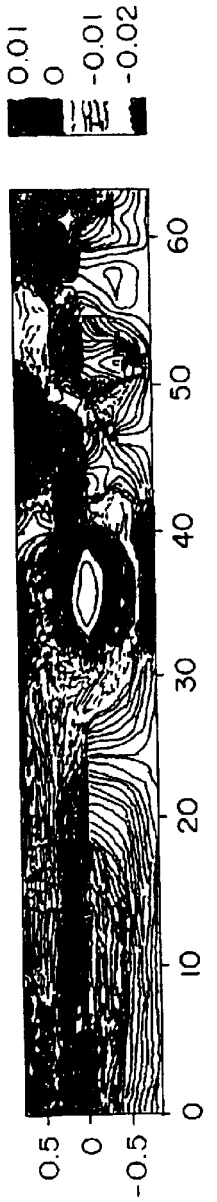

Several scans were conducted to show the clutter suppression capability and metallic object detection. A buried rock was seen to be readily distinguishable from the plastic M14 mine and the metallic object (a dime) was also easily detected by the capacitive sensor. FIG. 17Ca illustrates the difference between the M14 mine and the rock. The rock is the area at the 47 cm mark, whereas the M14 mine is at about the 36 cm mark and on the centerline of the scan. Also, a dime was placed between the rock and the landmine. The dime was also detected. FIG. 17Cb illustrates the ability of the capacitive array to detect metallic mines and UXO. The area at the 37 cm mark is an intact bomblet buried to a depth of 1 cm. As would be expected from the inclusion of a material of high dielectric constant, such as the metallic bomblet, within the sensed volume of sand, the sensor capacitance is increased. Also, the dime can be detected easily at approximately 1 cm depth using the capacitive array.

Figure 22A:
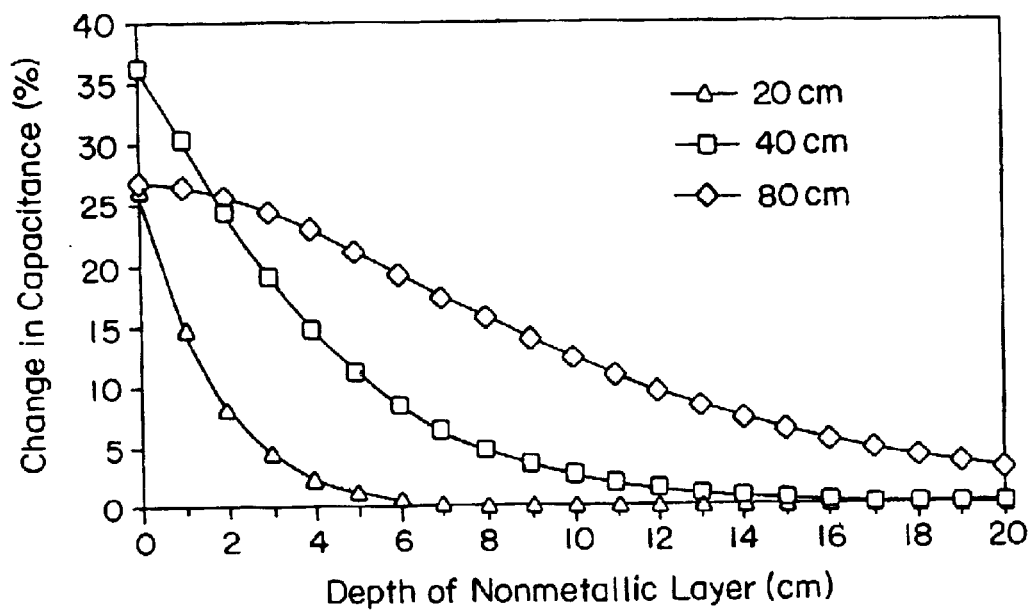
FIG. 22A illustrates that the computed sensor capacitance change (decrease) due to buried plastic layer in dry sand.
Figure 22B:
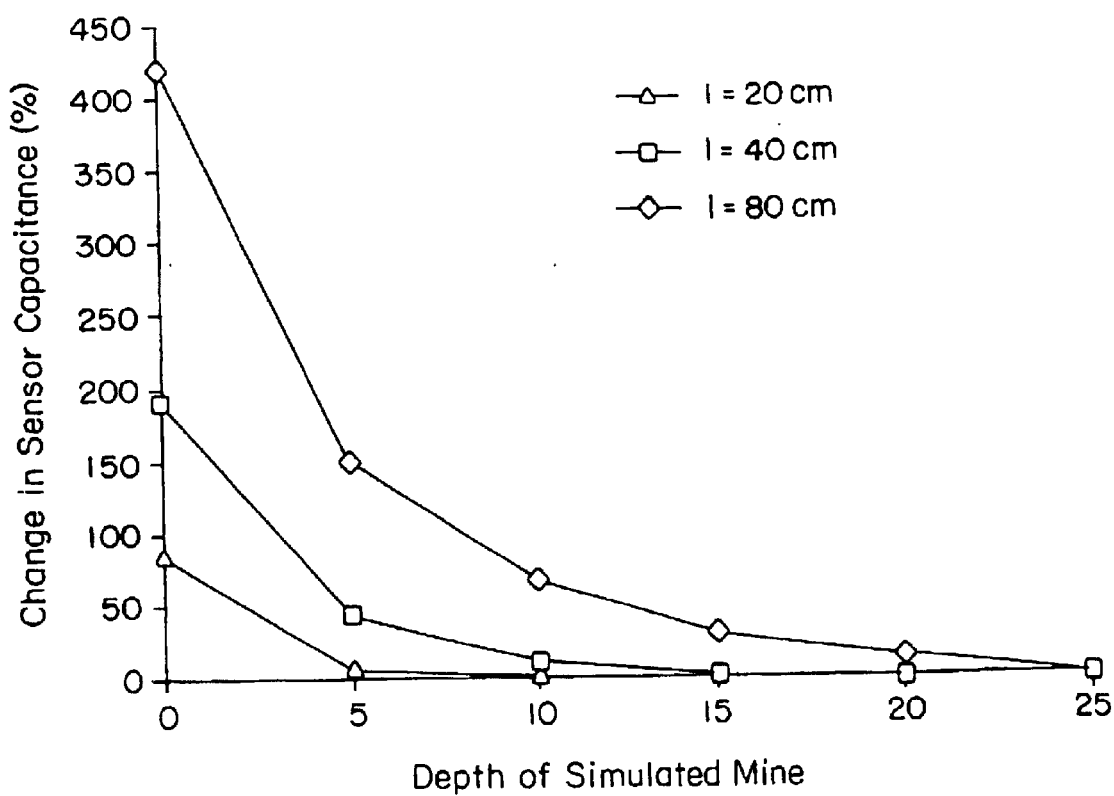
FIG. 22B illustrates that the computed change (increase) in sensor capacitance from simulated metal mine (layer construct) in dry sand.

FIGS. 22A and 22B show the IDED responses for metal and plastic at various depths. Thus, metal and plastic can be easily differentiated. For example, if the soil dielectric constant is above that for the plastic then the metal and plastic response will go in opposite directions.

Dielectric spectroscopy can be preformed to identified material types. The types of spectroscopy that can be preformed include derivative spectroscopy, ratio spectroscopy and other common types.

Dielectrometry measurements using long wavelength IDEDs can easily discern planar plastic and metal structures below the surface of dry or wet sand, and can be used to detect land mines without ground contact. However, an alternative embodiment may be more effective in certain instances. An alternative embodiment is an electrode arrangement which utilizes a circular center electrode surrounded by a coplanar, concentric electrode, a "Bull's Eye" sensor as illustrated in FIG. 16.

An axisymmetric computer simulation of the response of this sensor to a realistic nonmetallic mine was run. The mine was modeled as a 4 cm diameter cylinder, 4 cm thick, made of ABS and rubber, with two small metal components (firing pin and fuze), buried in dry sand. These dimensions and materials are representative of the Chinese Type 72 AP mine. A 2.5 cm sensor stand-off distance was used. Sensor capacitance is shown in Table 2. Wet sand further improves measurement sensitivity by providing values of conductance as well as capacitance. Since our existing computer simulation software can only solve planar geometries for AC conduction problems, the planar analog to the "Bull's Eye" geometry and cylindrical mine was simulated at 10 Hz. The calculated capacitance and conductance per unit length are listed in Table 3.

TABLE 2

Computed "Bull's Eye" Sensor Response to Buried Nonmetallic Mines in Dry and Wet Sand.

| Mine Depth (cm) | Dry Sand Capacitance (pf) | Wet Sand (10 Hz) | |
|---|---|---|---|
| | | Capacitance (pf/m) | Conductance (S/m × $10^{-14}$) |
| 0 | 5.276 | 19.4 | 1.51 |
| 2.5 | 5.363 | 21.4 | 2.18 |
| 5.0 | 5.386 | 21.4 | 2.03 |
| 7.5 | 5.395 | 21.3 | 1.95 |
| 10 | 5.398 | 21.3 | 1.91 |
| No Mine | 5.401 | 21.3 | 1.83 |

This preliminary analysis of the "Bull's Eye" electrode arrangement indicates fair capacitance response to nonmetallic mines close to the surface in dry sand, but poor response at increasing burial depths. In wet sand, however, the sensor conductance remains sensitive to the mine's presence down to 10 cm depth, as was seen in the planar layer analysis of lossy soil in the previous section. The lossy soil has a substantial $\in"$ as defined earlier.

Combined MWM and Dielectrometer Approach

Both the MWM and the dielectrometer sensors individually can detect and characterized land mines and bomblets that existing technology could not detect or, if detected, could not characterized. However, the results of both sensors produces details that were not possible individually. Table 3 shows the characteristics of both.

TABLE 3

Summary of the materials and characteristics for MWM and IDED.

| Sensor type | Potential attribute | Mine Constituents | | | | Placement | |
|---|---|---|---|---|---|---|---|
| | | high ferrite metals | low ferrite metals | non-ferrous metals | plastic (low or no-metal) | soil (clay, loam, etc.) | sand |
| MWM | detection | ✓ | ✓ | ✓ | | ✓ | ✓ |
| | depth | ✓ | ✓ | ✓ | | ✓ | ✓ |
| | shape identification | ✓ | ✓ | ✓ | | ✓ | ✓ |
| IDED | detection | ✓ | ✓ | ✓ | ✓ | ✓ | ✓ |
| | depth | ✓ | ✓ | ✓ | ✓ | ✓ | ✓ |
| | shape | ✓ | ✓ | ✓ | ✓ | ✓ | ✓ |
| | identification | | | | ✓ | ✓ | ✓ |

The MWM comprises a meandering primary winding, with a secondary winding on each side of the primary. The MWM is essentially a planar transformer, in which the primary winding is inductively coupled with the secondary winding through the neighboring material. The IDED, on the other hand, consists of two separate, but coplanar, electrodes. Whereas the MWM can be considered a transformer within a single plane, the IDED can be considered a parallel plate capacitor within a single plane.

While no single tool will detect and identify all subsurface objects, the MWM (or single period deep penetration array) and the IDED (or improved single period design described earlier) sensors will located and identify a majority of mines and bomblets for humanitarian demining problems.

In one embodiment the deep penetration MWM-Array might be used to detect metal, then the single period dielectrometer might be used to determine if the metal is surrounded by plastic.

It is recognized that the MWM-Array system and the IDED-Array system can have features that can be used to augment the work of various other tools. For example, to support the use of an airknife for bomblet removal following a detection, the MWM-Array Bomblet Discrimination System could include a means of marking the exact bomblet location. Once a bomblet has been identified, the sensor array could be maneuvered to position the bomblet to a particular part of the array, for example the center. The system would be equipped with a means of dispensing spray paint or another environmentally friendly marker directly to the exact bomblet location.

While the sensors discussed above have been individual sensors, it is recognized that a Local Positioning System (LPS) could be used to coordinate large area scanning by teams of field operators and to map and record buried ordinance and clutter locations. In view of the relative lightweight of the sensors, a light-weight mat array could cover large arrays, several hundreds of feet, without exploding encountered landmines, such as illustrated in FIGS. 19A and 19B. The light-weight mat has a flexible sheet, such as a durable flexible fabric or composite material, that retains the conductors in proper position.

Figure 20:
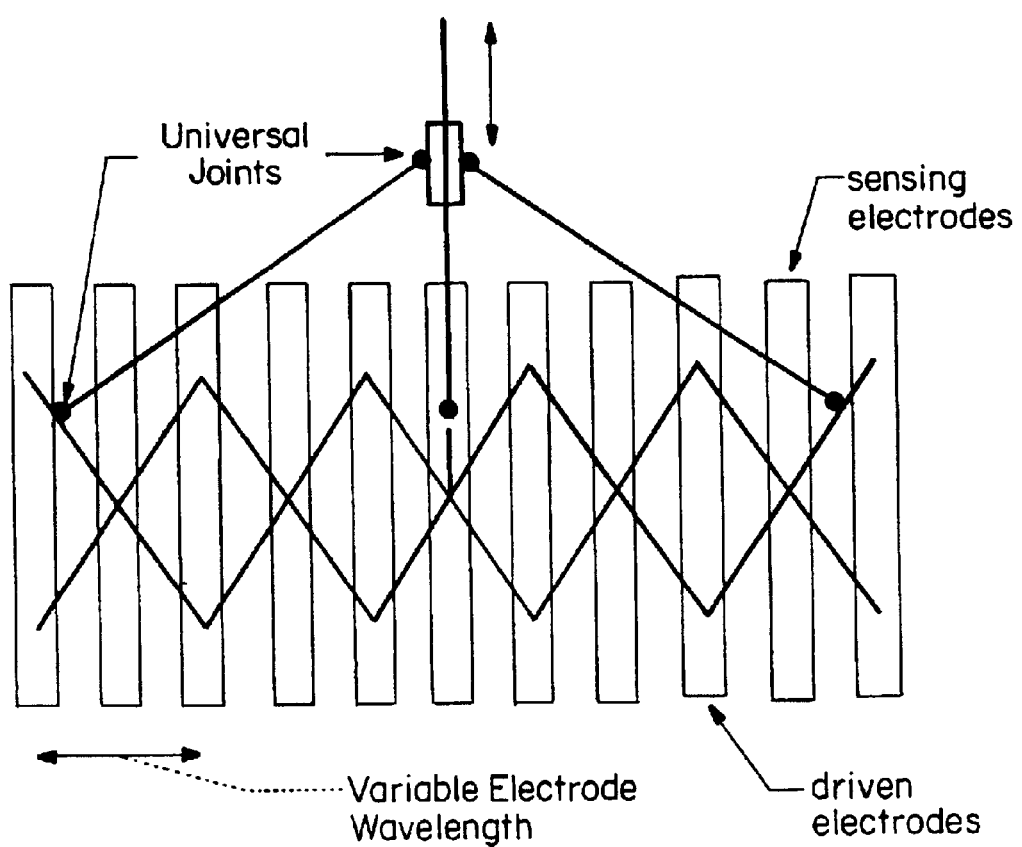
FIG. 20 shows a mechanically adjustable wavelength sensor.

It is recognized that the wavelength can be varied by placing the electrodes on an adjustable face plate as illustrated in FIG. 20. Both the driven electrodes and the sensing electrodes are attached to an accordion or scissors frame, which can expand and contract. The moving of the driven electrodes and the sensing electrodes closer or further apart results in mechanically varying the wavelength.

Additional improvements in the imaging capability of the segmented dielectric sensor of FIG. 15B may be achieved by using the outermost sensing electrodes 134 as guard electrodes. This helps to minimize the effects of the finite length of the sensor as it reduces unmodelled differences in the coupling of the electric field to the various sense electrodes. The operation of the guards is similar to the use of the guard electrode 126 in FIG. 15A, which has extended portions that wrap around the sides of the sense electrodes 132 to prevent coupling of the sensing electrodes to electric fields have shorter depths of penetration.

Figure 23:
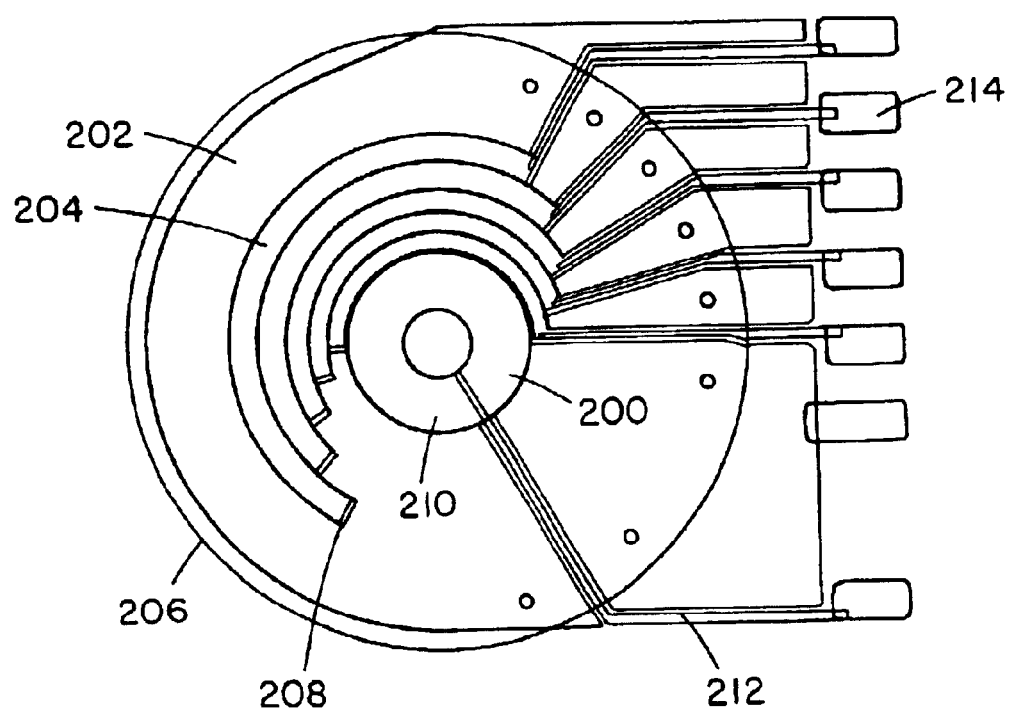
FIG. 23 shows a circular center electrode surrounded by multiple concentric sensing elements and a guard electrode, with a shielding plate placed behind the entire structure.

A circular symmetric sensor, as shown in FIG. 23, is described for the characterization of dielectric materials and the detection of the objects and/or flaws in dielectric materials. A time varying electrical voltage is applied to the center electrode 200, which creates a fringing electric field that couples to the other conductors through the material under test (MUT). The currents to virtually grounded segmented sensing electrodes 204 are then measured, so that the ratios of the currents to the applied voltage, known as the transadmittance, can be related to the properties of the MUT. A guard electrode 202 held at the ground potential minimizes stray coupling to the sensing electrodes and maintains the circular symmetry of the geometry. A ground electrode 206 is placed on the backside of the sensor in order to prevent coupling of the applied field to any materials behind the sensor. The gap 208 between the sensing electrodes and the guard electrode is also kept small in order to minimize the effects of unmodelled fringing electric fields. Connections are made to the electrodes through the lead paths 212 and the connector pads 214.

This sensor is a combination of the bullseye sensor (FIG. 18) and the segmented Cartesian sensor (FIGS. 15A, 15B, and 15C). An advantage of this sensor design is the use of a single drive element at the center of the sensor structure, together with multiple sensing elements within the same sensor footprint. The multiple sensing elements provide sensitivity to multiple depths of penetration and different spatial wavelengths for the imposed electric field. Analogous to the electric field map of FIG. 14, the smaller diameter sense electrodes are sensitive to the portions of the electric field with small penetration depths while the larger diameter sense electrodes respond to portion of the electric field which have large penetration depths. Thus, the use of multiple sensing elements allows for the spatial profile of dielectric materials to be measured.

The dimensions of the various components of the sensor can be adjusted to optimize the sensor response to the properties of the MUT that are to be determined. These dimensions include the width and angular span of the sensing electrodes 202, the diameter of the drive electrode 200, the gap 210 between the drive electrode 200 and the guard electrode 204, and the thickness of the substrate material that separates the electrode pattern on the top surface and the ground plane 206 on the bottom of the sensor. Typical considerations for the choice in the sensor dimensions depend upon the measurement application. For example, increasing the angular span for the sense elements improves the measurement sensitivity for layered media but decreases the sensitivity for defect detection if the defect sizes are comparable to the diameter of the sensor. Increasing the width of the sense electrodes provides more averaging of the short and long wavelength modes, which increases the total signal to the electrode but may decrease the selectivity or measurement independence between the sensing elements. Decreasing the drive electrode diameter, increasing the gap spacing, or increasing the substrate thickness increases the fundamental wavelength and depth of penetration for the measurements. In one embodiment, each of the sensing electrodes span 180 degrees and the spacing between the electrodes is 0.125 mm. The corresponding inner and outer diameters for the other features are 0 and 3.5 mm for the drive electrode, 9.0 and 9.25 mm for the inner portion of the guard electrode, 9.5 and 11.0 mm for the first sense electrode, 11.25 and 13.0 mm for the second sense electrode, 13.25 and 15.375 for the third sense electrode, 15.625 and 18.125 mm for the fourth sense electrode, 18.375 and 21.25 mm for the fifth sense electrode, and 21.5 and 40.0 mm for the outer portion of the guard electrode. The outer diameter for the ground plane 206 and the guard electrode 204 are made as large as possible to establish the ground planes for the sensor.

Figure 24:
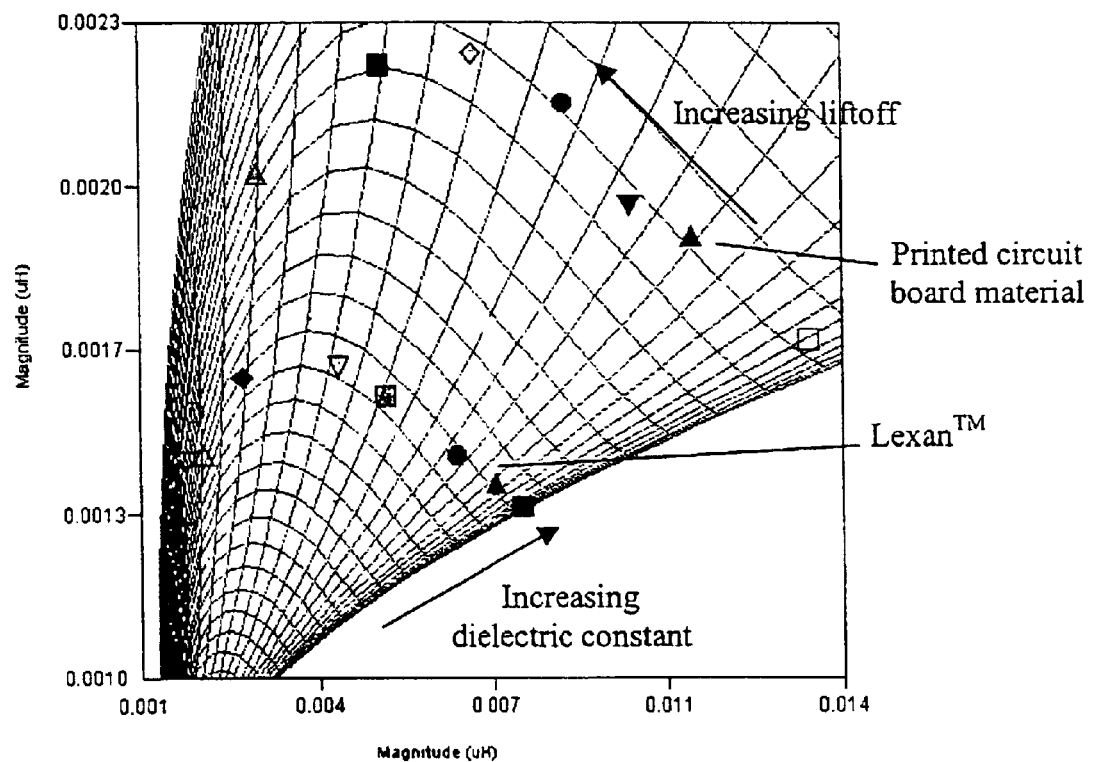
FIG. 24 illustrates a permittivity-liftoff measurement grid.

To convert the transadmittance measured with the sensor into property values, measurement grids can be used, as described earlier for magnetic and conducting materials in U.S. patent application Ser. No. 09/310,507, filed May 12, 1999, entitled "Methods for Processing, Optimization, Calibration and Display of Measured Dielectrometry Signals Using Property Estimation Grids," the entire teachings of which are incorporated herein by reference. A representative grid for measurements on insulating materials is shown in FIG. 24. In this case, there is no phase information in the measurements, as the MUT is insulating and the magnitudes of the transadmittances from two of the sensing elements are used to create the grid. The grid illustrates the dependence of the sensed magnitudes on the dielectric constant of a material with a known thickness and the air gap between the MUT and the sensor. (A material is considered "thick" and can be modeled as an infinite half-space when the thickness is much larger than radius of the inner guard electrode. When the material is not considered "thick" the grids and model must account for the thickness.) Sets of data points for two different materials, each 1.58 mm thick, are plotted on the grid of FIG. 24. The first material is Lexan™, which has a dielectric constant of approximately 3.2, while the second material is a printed circuit board substrate material, which has a dielectric constant of approximately 4.6. The flat and rigid sample materials were suspended above the face of the sensor to simulate non-contact measurements of the materials with various liftoffs or air gaps. For each material, the sample points approximately follow lines of constant dielectric constant, which illustrates the use of multiple wavelengths to provide non-contact measurements of the material dielectric constant.

Figure 25:
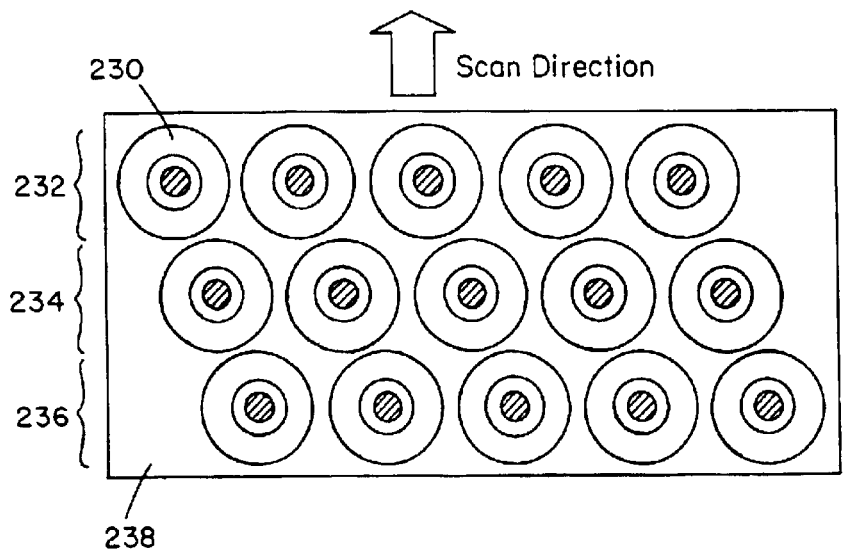
FIG. 25 illustrates a schematic view for an array of dielectrometer sensors.

The sensors can also be configured into an array format, a illustrated in FIG. 25, for scanning and imaging of the dielectric properties over the surface of a material. Each sensor 230 can have single or multiple sensing elements within the sensor footprint, depending upon the application. Each row of sensors (232, 234, 236) is staggered, perpendicular to the scan direction for the array, to provide complete coverage when the array is scanned across the surface of the MUT. In the illustration of FIG. 25, each row of sensors is staggered by one-third of the periodic distance between the centers of adjacent sensors within each row. Preferably, a ground plane 238 fills the spaces between each of the sensors and also covers the back of the sensor array substrate material to prevent stray coupling of the electric field both between the sensors and to materials behind the sensor array.

Another aspect of this invention is a technique for enhancing the signal measured with dielectrometry sensors for the detection of flaws or defects in insulating or semi-insulating materials. In many insulating materials, such as glass fiber composites, flaws such as cracks, delaminations, or excess porosity can reduce the structural integrity of the material. These flaws can be present in the as-manufactured condition or can be the result of service related aging. In either case, there is a need for the nondestructive testing of these insulating materials.

Figure 32:
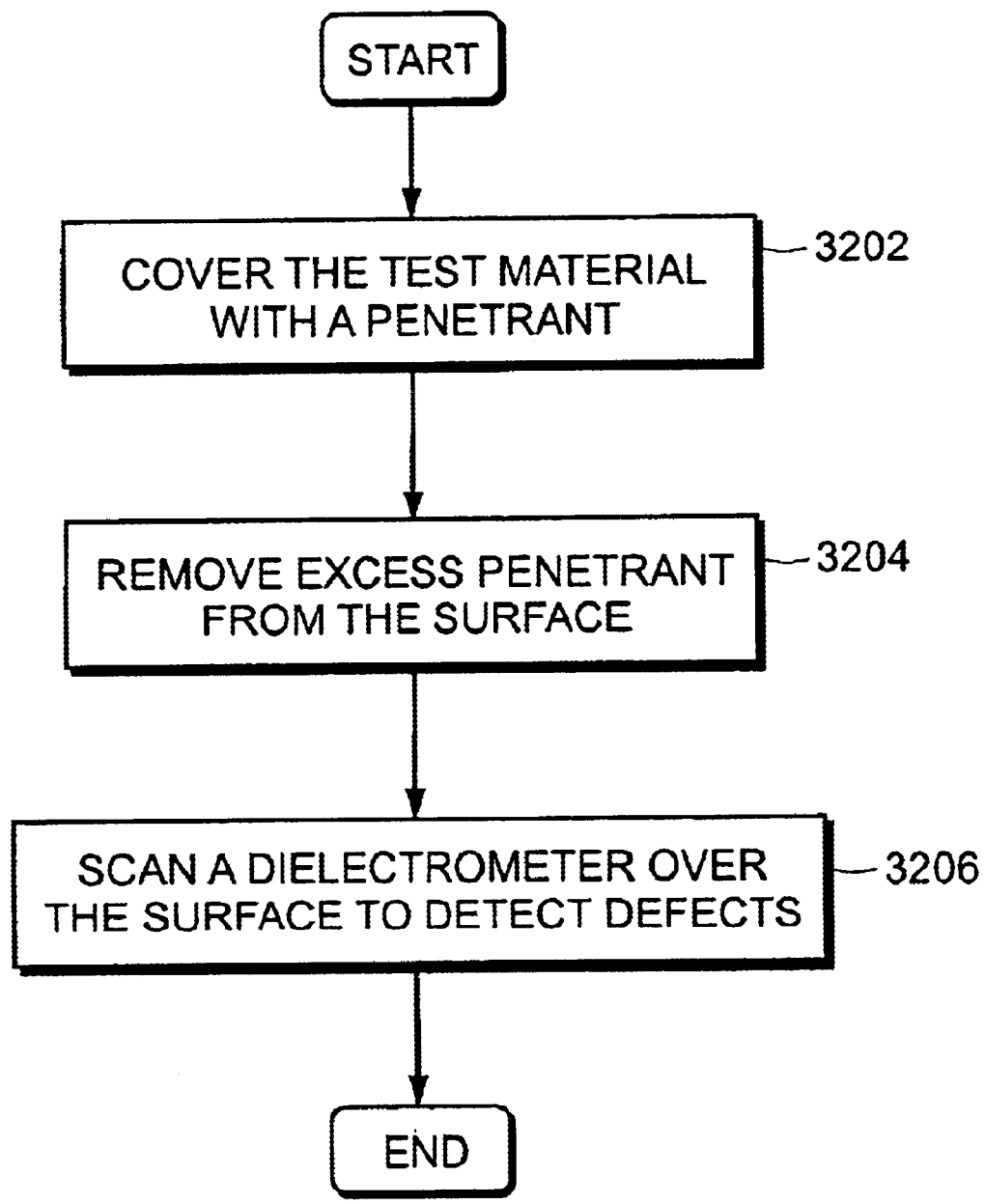
FIG. 32 is a flow chart of detecting flaws in the test material.

One technique for detecting flaws in insulating composites is to apply a liquid penetrant paint or dye to one surface of a part (see FIG. 32, step 3202). Then, after cleaning the surface of the part (step 3204), using fluorescent lighting or visual examinations only the penetrant that seeped into a flaw is illuminated. Another technique is to scan a capacitive sensor or sensor array over the surface of a composite to measure the dielectric properties (step 3206). A crack or excess porosity is typically detected as a reduction in the effective capacitance as the permittivity of the material under test is generally greater than air. Since the difference in dielectric constants between the test material and air is generally not very large, the signal from a crack or a notch may be small compared with variations in the porosity, surface roughness, or thickness of the composite.

One aspect of the invention described here improves the sensitivity of the dielectric measurement to the presence of a flaw by using a liquid penetrant, such as water, that increases the dielectric contrast between the composite and the material in the flaw. After applying the liquid, the flaws are more readily detected with a standard dielectric sensor scanned over the surface of the material. The amount of liquid detected can be correlated directly with the size of the flaw (e.g., width and depth of a crack).

Although ASTM Standard E165-80 describes the standard practice for Liquid Penetrant Inspection Methods, a liquid penetrant has not been combined with dielectrometry measurements for flaw detection. Generally, liquid penetrant methods require extensive cleaning and preparation of the part in order to detect any flaws or defects, and also use a special penetrant along with some sort of a developer agent to fix the flaw indication so that the flaw can be visually detected. This standard does not refer to the use of capacitive sensing or dielectrometry as an inspection method that can be combined with the indicator material.

To illustrate the improvement in sensitivity with this technique, dielectric measurements were performed on several glass fiber composites which had notches cut into them. While the dielectric response from the notches using a dielectric sensor was near the limit of sensitivity for an air-filled notch, a distinct response was obtained when the notch was filled with water.

These measurements demonstrated the sensitivity of dielectrometry to the presence and depth of flaws in glass fiber composites, such as those used in wind turbine or flywheel applications. Three samples were measured. Each sample consisted of a glass fiber composite plate with dimensions of 0.8×0.5×0.03 m and contained a single linear notch cut near the center of the plate, starting from the edge with the longest dimension. The average notch depths were approximately 5.6, 9.6, and 19.7 mm near the edge, so that the nominal notch depths were 5, 10, and 20 mm, respectively. The depth of the notch was reasonably constant until within approximately 4 cm of the center of the plate, where the depth decreased gradually until reaching the surface as a result of the circular saw used to make the notch. Each notch was 1.1 mm wide and approximately 25 cm long.

Figure 26:
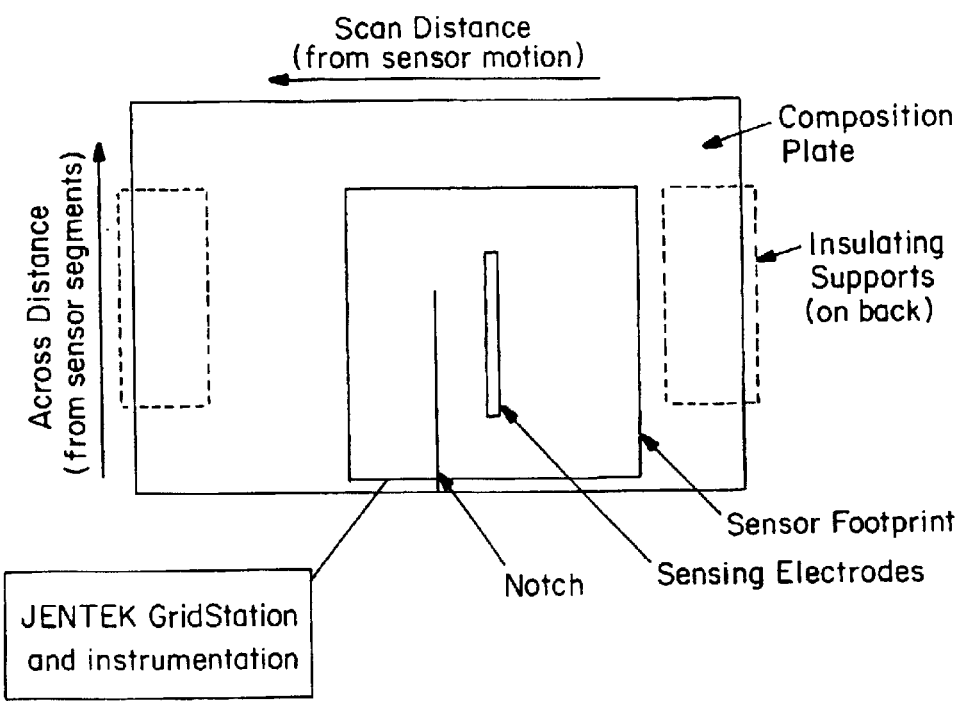
FIG. 26 shows a schematic diagram for the scan of a segmented electrode dielectric sensor array over a notched fiberglass plate.

Measurement scans were performed with an existing segmented dielectric sensor over the notched surface of each plate. A schematic diagram of the experimental setup is shown in FIG. 26. The plates were supported from underneath at the ends with insulating blocks and the sensor was suspended over the plates, leaving a nominal air gap of 6 mm between the plates and the face of the sensor. The sensor was scanned over the notch and the differential capacitance between the sensing elements was measured. These measurements were taken at a frequency of approximately 40 kHz with JENTEK's GridStation data acquisition software and then converted into an image of the relative capacitance over the surface of the plate. In this case the sensor was configured to provide differential measurements which provide a measure of the change in the local capacitance. Undamaged areas should have a near-zero differential capacitance while over the notch the peak magnitude of the differential capacitance should correlate with the crack depth. The image resolution in the array direction is determined by the five segments of the sensor array while the incremental distance covered when moving the sensor determines the image resolution in the scan direction. The sensor was scanned a distance of 10 or 15 cm over the notch with nominally equal distances on either side of the notch. The sensor used was in the segmented Cartesian format (shown in FIG. 15B).

Figure 27:
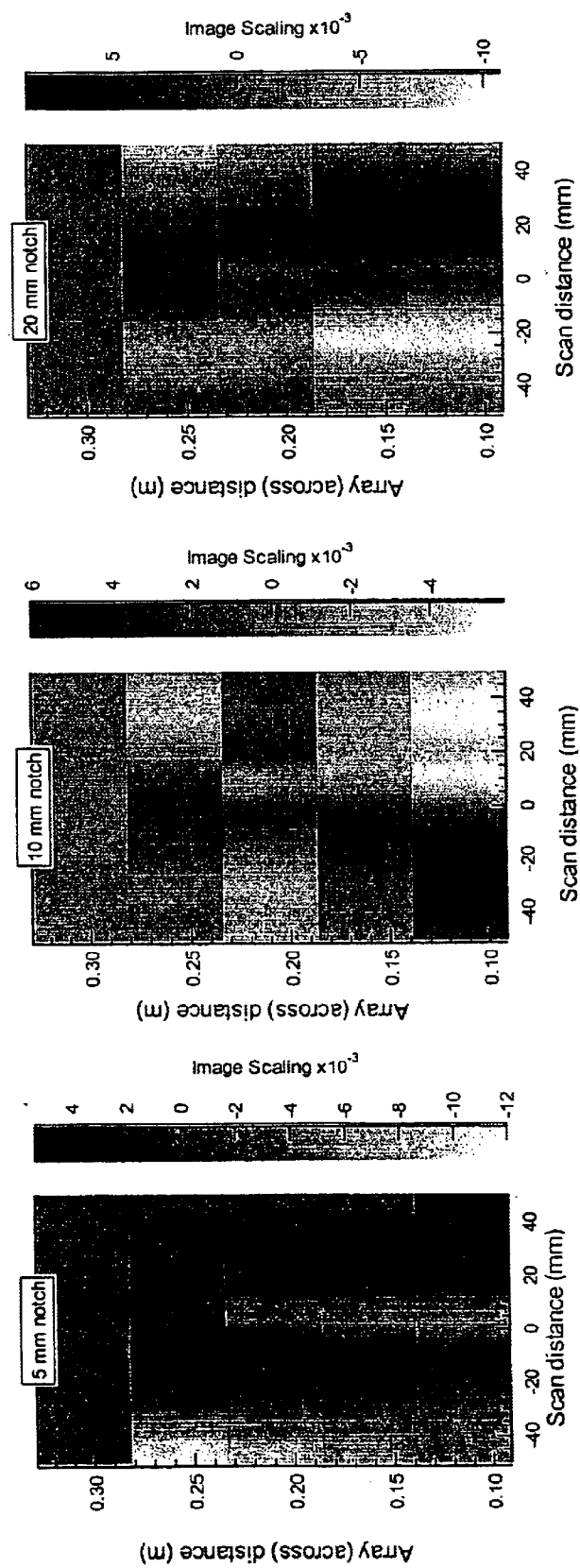
FIG. 27 illustrates representative raw (unfiltered) measurement scans over several fiberglass plates containing notches of different depths.

A set of measurement scans over the notched samples is shown in FIG. 27. Two measurements were performed on the 5 mm deep notch sample. The 5 mm deep notch is apparent in both measurements but the notch is not as clear for the 10 mm and 20 mm deep notches. This result was surprising because the deeper notches were expected to give a more distinct image; other effects appeared to be significant. In each sample, relatively large and gradual background variations in the measured capacitance appeared to mask the dielectric response to the notch. This background variation may be due to damage of the glass fibers in the composite or thickness variations in the plates, since the sensor is sensitive to the back surface of the plate.

Figure 28:
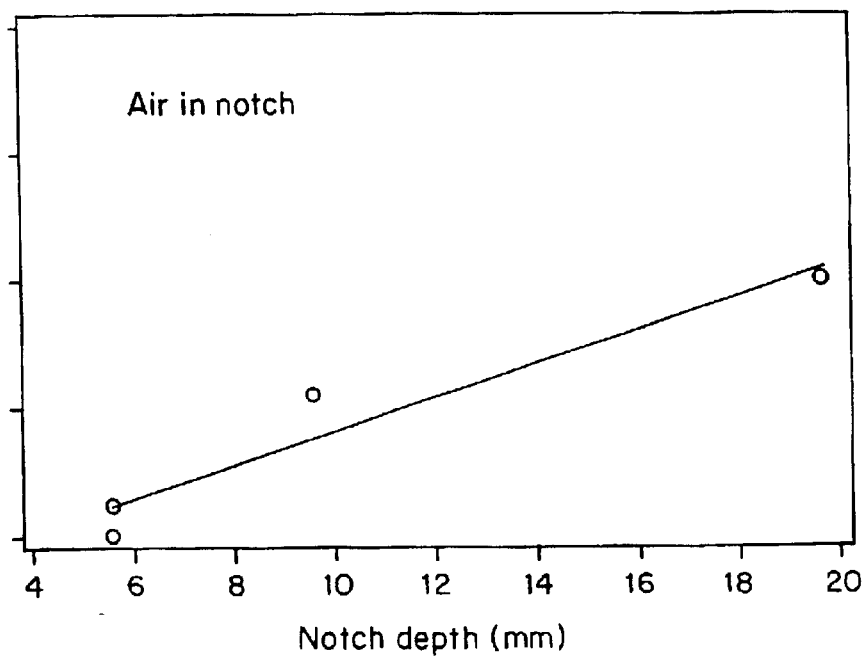
FIG. 28 shows a plot of the change in capacitance compared with the depth of the notch.

To quantify the sensitivity to crack depth, the reduction in capacitance associated with the notch was estimated by subtracting the slowly varying background capacitance from the capacitance over the center of the notch. Since the dielectric constant of the glass fiber is greater than the dielectric constant of air, the capacitance over the notch should be smaller than the capacitance over the undamaged areas and the notch should create a reduction in the differential capacitance. These estimates, plotted in FIG. 28, show that the change in capacitance trends with the notch depth. The change in capacitance was expected to become more negative with increasing notch depth. The opposite trend was observed, possibly because of the method used to estimate the effect of the notch; the background variation in the relative capacitance ranged from −0.01 to 0.01 while the response of the notch was of order −0.004 to −0.008.

Figure 29:
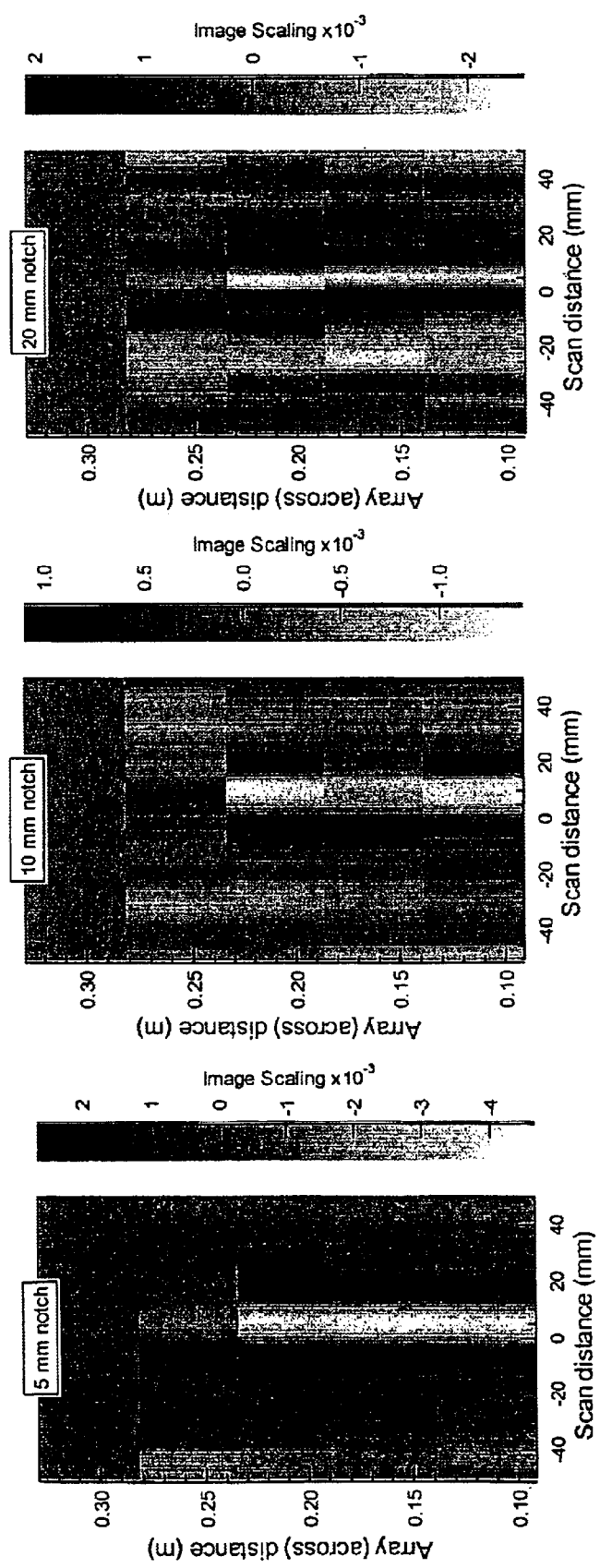
FIG. 29 illustrates representative processed (filtered) measurement scans over several fiberglass plates containing notches of different depths

Filtering algorithms can also be applied to the image to highlight the presence of the notch. FIG. 29 shows the effect of a detrending filter applied to the images of FIG. 27. This filter was used to help remove some of the slow background variations in the relative capacitance. The presence of the notches is now more evident, but a higher resolution image (more array elements) would provide a better signature for the notch.

Figure 31:
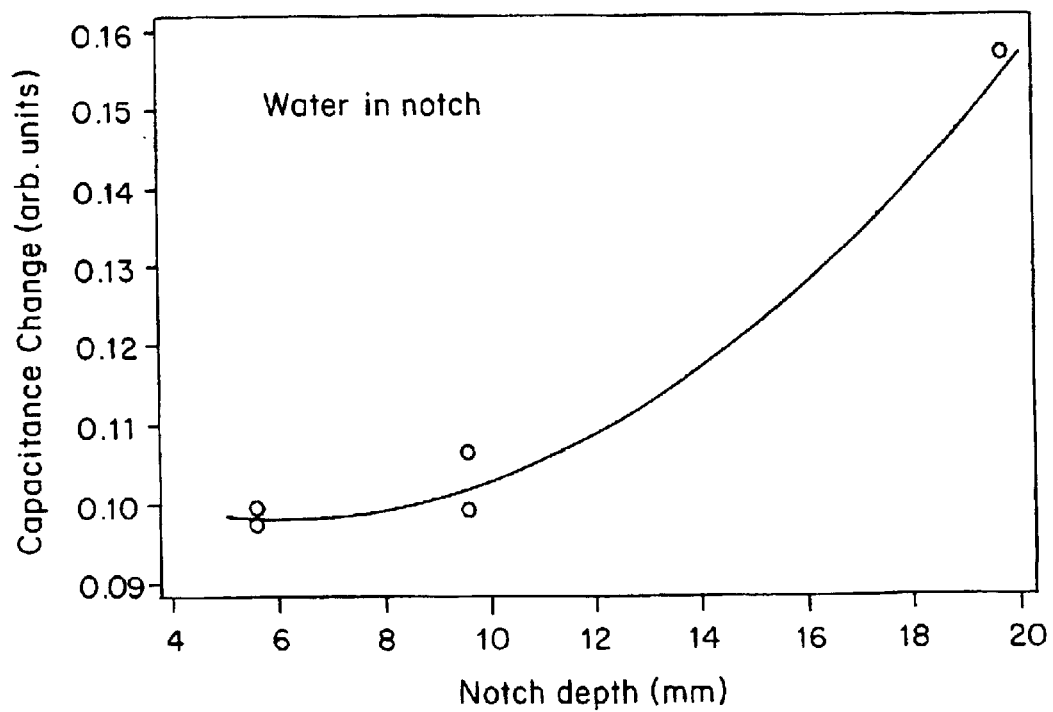
FIG. 31 shows a plot of the change in capacitance compared with the depth of the notch when water fills the notch.
Figure 30:
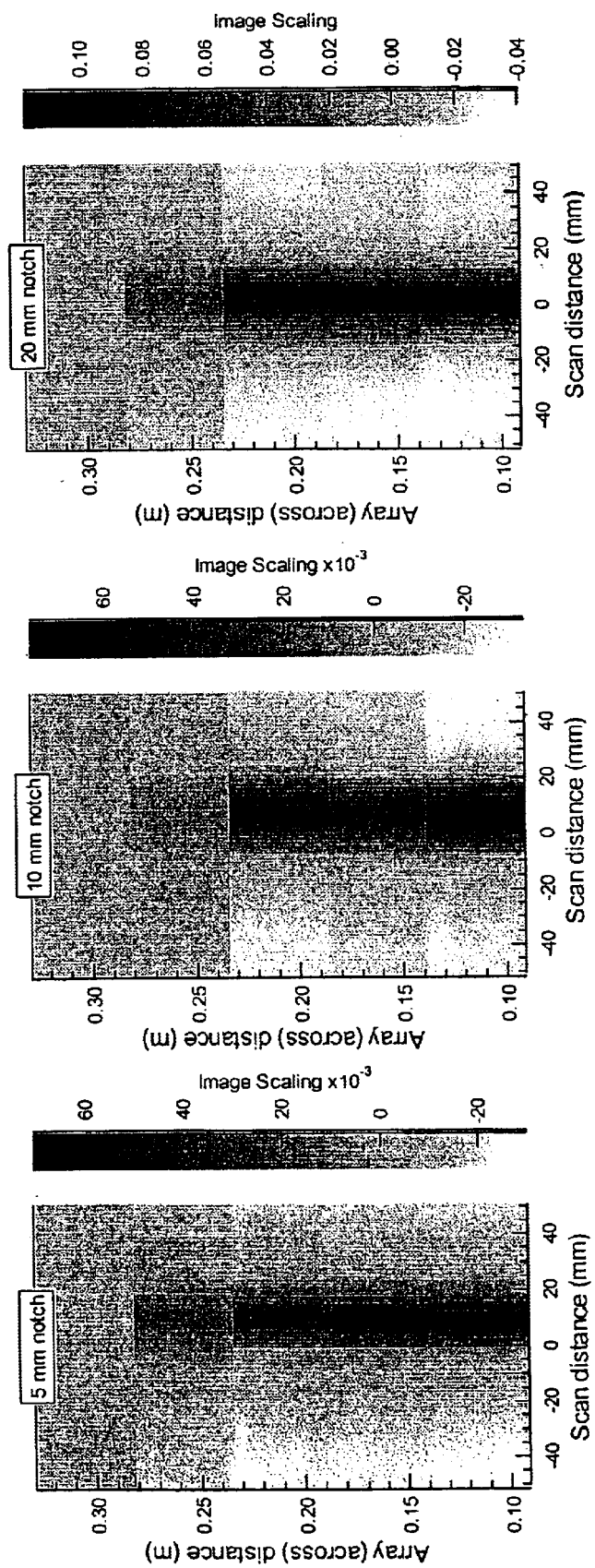
FIG. 30 illustrates representative measurement scans over several fiberglass plates containing notches of different depths filled with water.

Additional measurements were performed with water filling the notch as a nominal "liquid penetrant." Water has a high dielectric constant and can provide a greater contrast with the dielectric properties of the glass fiber than is possible with air. The measured images, shown in FIG. 30, clearly show the presence of the crack in each case. The sensing elements of the sensor are approximately 1 cm wide so that the effective image width of the notch and the scan distance beneath a sensing element is approximately 2 cm. In this case, the water causes an increase or a peak in the differential capacitance because the dielectric constant of water is greater than the dielectric constant of the glass fiber. The peak change in the capacitance is sensitive to the notch depth as shown in FIG. 31.

For defect detection in insulating materials such as glass fiber composites, several sensor design issued should be considered. For example, the sensor dimensions should be optimized relative to the size and depth of the flaws to be detected. Using a sensor that is too large will not have the sensitivity to detect small defects while using a sensor that is too small may not provide accurate depth or size information or may not detect deep defects. For imaging of flaws and defects, the number and size of the array sensing elements should also be designed to provide a high image resolution image for crack detection.

The devices and method disclosed herein may be applied as described in U.S. Provisional Application No. 60/121, 713, filed Feb. 26, 1999 the entire teachings of which are incorporated herein by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for detecting defects in dielectric test materials comprised of the following steps:

immersing or covering a test material with a penetrant material, the complex dielectric properties of the penetrant material and the test material being substantially different;

removing excess penetrant material from the surface of the test material; and scanning a dielectrometer apparatus over the surface of the test material to detect defects.

2. The method of claim 1 wherein the penetrant material is a liquid.

3. The method of claim 2 wherein the liquid is water.

4. The method of claim 1 wherein the penetrant material is a powder.

* * * * *